(12) United States Patent
Thomas et al.

(10) Patent No.: US 7,237,115 B1
(45) Date of Patent: Jun. 26, 2007

(54) AUTHENTICATING CONCEALED PRIVATE DATA WHILE MAINTAINING CONCEALMENT

(75) Inventors: Edward V. Thomas, Albuquerque, NM (US); Timothy J. Draelos, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 941 days.

(21) Appl. No.: 09/964,221

(22) Filed: Sep. 26, 2001

(51) Int. Cl.
*H04L 9/00* (2006.01)
(52) U.S. Cl. ............... 713/176; 713/168; 713/186
(58) Field of Classification Search ............ 713/186, 713/176
See application file for complete search history.

(56) References Cited

U.S. PATENT DOCUMENTS

| | | | | |
|---|---|---|---|---|
| 4,379,205 A * | 4/1983 | Wyner | .......................... | 380/28 |
| 4,882,779 A * | 11/1989 | Rahtgen | ....................... | 705/72 |
| 4,949,381 A * | 8/1990 | Pastor | .......................... | 380/51 |
| 5,050,212 A * | 9/1991 | Dyson | ........................ | 713/187 |
| 5,216,925 A * | 6/1993 | Odernheimer | ............ | 73/863.12 |
| 5,228,094 A * | 7/1993 | Villa | ............................ | 382/116 |
| 5,394,471 A * | 2/1995 | Ganesan et al. | ............ | 713/183 |
| 5,454,040 A * | 9/1995 | Russell | ....................... | 380/276 |
| 5,463,657 A * | 10/1995 | Rice | ............................. | 375/150 |
| 5,497,430 A * | 3/1996 | Sadovnik et al. | ............ | 382/156 |
| 5,680,460 A * | 10/1997 | Tomko et al. | .............. | 713/186 |
| 5,710,833 A * | 1/1998 | Moghaddam et al. | ....... | 382/228 |
| 5,719,950 A * | 2/1998 | Osten et al. | ................. | 382/115 |
| 5,793,881 A * | 8/1998 | Stiver et al. | ................. | 382/115 |
| 5,867,802 A * | 2/1999 | Borza | ........................ | 340/5.53 |
| 5,887,063 A * | 3/1999 | Varadharajan et al. | ...... | 713/172 |
| 6,006,170 A * | 12/1999 | Marcantonio et al. | ...... | 702/182 |
| 6,038,315 A | 3/2000 | Strait et al. | .................... | 380/23 |
| 6,092,196 A * | 7/2000 | Reiche | .......................... | 726/6 |
| 6,122,403 A * | 9/2000 | Rhoads | ........................ | 382/233 |
| 6,151,678 A * | 11/2000 | Davis | ........................... | 726/35 |
| 6,184,351 B1 * | 2/2001 | Biere et al. | ................. | 530/350 |
| 6,186,004 B1 * | 2/2001 | Kaduchak et al. | ............ | 73/596 |
| 6,219,794 B1 * | 4/2001 | Soutar et al. | ................. | 726/18 |
| 6,256,737 B1 * | 7/2001 | Bianco et al. | .............. | 713/186 |
| 6,259,790 B1 * | 7/2001 | Takagi et al. | ................. | 380/30 |
| 6,317,834 B1 * | 11/2001 | Gennaro et al. | ............ | 713/186 |

(Continued)

FOREIGN PATENT DOCUMENTS

WO    WO 9705578 A1 *    2/1997

OTHER PUBLICATIONS

Davida et al., On Enabling Secure Applications Through Off-line Biometric, May 1998, IEEE Symposium on Security and Privacy, pp. 148-157.*

(Continued)

*Primary Examiner*—Nasser Moazzami
*Assistant Examiner*—David Garcia Cervetti
(74) *Attorney, Agent, or Firm*—Robert D. Watson

(57) ABSTRACT

A method of and system for authenticating concealed and statistically varying multi-dimensional data comprising: acquiring an initial measurement of an item, wherein the initial measurement is subject to measurement error; applying a transformation to the initial measurement to generate reference template data; acquiring a subsequent measurement of an item, wherein the subsequent measurement is subject to measurement error; applying the transformation to the subsequent measurement; and calculating a Euclidean distance metric between the transformed measurements; wherein the calculated Euclidean distance metric is identical to a Euclidean distance metric between the measurement prior to transformation.

27 Claims, 12 Drawing Sheets

U.S. PATENT DOCUMENTS

| | | | |
|---|---|---|---|
| 6,327,376 B1 * | 12/2001 | Harkin | 382/124 |
| 6,347,762 B1 * | 2/2002 | Sims et al. | 244/3.17 |
| 6,359,582 B1 * | 3/2002 | MacAleese et al. | 342/22 |
| 6,363,485 B1 * | 3/2002 | Adams et al. | 713/186 |
| 6,397,166 B1 * | 5/2002 | Leung et al. | 702/179 |
| 6,487,306 B1 * | 11/2002 | Jain et al. | 382/125 |
| 6,539,101 B1 * | 3/2003 | Black | 382/124 |
| 6,553,129 B1 * | 4/2003 | Rhoads | 382/100 |
| 6,560,352 B2 * | 5/2003 | Rowe et al. | 382/115 |
| 6,567,533 B1 * | 5/2003 | Rhoads | 382/100 |
| 6,574,742 B1 * | 6/2003 | Jamroga et al. | 713/400 |
| 6,580,808 B2 * | 6/2003 | Rhoads | 382/100 |
| 6,580,814 B1 * | 6/2003 | Ittycheriah et al. | 382/115 |
| 6,591,224 B1 * | 7/2003 | Sullivan et al. | 702/179 |
| 6,618,806 B1 * | 9/2003 | Brown et al. | 713/186 |
| 6,647,128 B1 * | 11/2003 | Rhoads | 382/100 |
| 6,681,029 B1 * | 1/2004 | Rhoads | 382/100 |
| 6,697,779 B1 * | 2/2004 | Bellegarda et al. | 704/246 |
| 6,697,947 B1 * | 2/2004 | Matyas et al. | 713/182 |
| 6,700,990 B1 * | 3/2004 | Rhoads | 382/100 |
| 6,700,993 B1 * | 3/2004 | Minematsu | 382/100 |
| 6,704,299 B1 * | 3/2004 | Li et al. | 370/332 |
| 6,741,636 B1 * | 5/2004 | Lender | 375/146 |
| 6,748,362 B1 * | 6/2004 | Meyer et al. | 704/500 |
| 6,760,438 B1 * | 7/2004 | Hui et al. | 380/28 |
| 6,775,392 B1 * | 8/2004 | Rhoads | 382/100 |
| 6,778,688 B2 * | 8/2004 | Aggarwal et al. | 382/125 |
| 6,798,334 B1 * | 9/2004 | Meister et al. | 340/5.52 |
| 6,821,714 B1 * | 11/2004 | Mescher et al. | 430/318 |
| 6,836,554 B1 * | 12/2004 | Bolle et al. | 382/116 |
| 6,854,879 B2 * | 2/2005 | Pavlidis | 374/45 |
| 6,862,091 B2 * | 3/2005 | Johnson | 356/326 |
| 6,876,757 B2 * | 4/2005 | Yau et al. | 382/125 |
| 6,895,514 B1 * | 5/2005 | Kermani | 713/202 |
| 6,920,231 B1 * | 7/2005 | Griffin | 382/115 |
| 6,928,181 B2 * | 8/2005 | Brooks | 382/115 |
| 6,928,546 B1 * | 8/2005 | Nanavati et al. | 713/186 |
| 2002/0009213 A1 * | 1/2002 | Rowe et al. | 382/115 |
| 2003/0182246 A1 * | 9/2003 | Johnson et al. | 705/76 |
| 2004/0148509 A1 * | 7/2004 | Wu | 713/186 |
| 2004/0193893 A1 * | 9/2004 | Braithwaite et al. | 713/186 |

OTHER PUBLICATIONS

Davida et al., Perfectly Secure Authorization and Passive Identification for an Error Tolerant Biometric System 1999, Springer-Verlag, Lecture Notes In Computer Science; vol. 1746, pp. 104-113.*

Simmons, GJ, Identification of data, devices, documents, and individuals, 1991, IEEE.*

Simmons, GJ, How to insure that data acquired to verify treaty compliance are trustworthy, May 1988, IEEE.*

Y. S. Chow, et al., Probability Theory, Independence, Interchangeability, Martingales 3d ed., at 336, Springer-Veriag (1997).

R. B. D'Agostino, et al., Goodness-of-fit Techniques, Marcel Dekker (1966).

S. Karlin, et al., A Second Course in Stochastic Processes at 454, Academic Press (1981).

V. Senk, et al., "A New Speech Scrambling Concept Based on Hadamard Matrices", IEEE Signal Processing Letters 4(6): 161-163 (Jun. 1997).

Davida, G. I., et al., "On Enabling Secure Applications Through Off-Line Biometric Identification", *Proceedings of the IEEE Symposium on Security and Privacy, Oakland CA*, (Nat 1998).

Thomas, E. V., et al., *SAND 2000-2467*, (2000).

* cited by examiner

AUTHENTICATING CONCEALED PRIVATE DATA WHILE MAINTAINING CONCEALMENT

FEDERALLY SPONSORED RESEARCH

The Government has rights to this invention pursuant to Contract No. DE-AC04-94AL85000 awarded by the U.S. Department of Energy.

BACKGROUND OF THE INVENTION

The present invention relates to authentication of concealed data without converting the data to its unconcealed form.

Note that the following discussion refers to a number of publications by author(s) and year of publication, and that due to recent publication dates certain publications are not to be considered as prior art vis-a-vis the present invention. Discussion of such publications herein is given for more complete background and is not to be construed as an admission that such publications are prior art for patentability determination purposes.

In many situations, it is desirable to authenticate data without revealing the data in detail. For instance, a party to a multilateral treaty might want to convince monitoring inspectors of the treaty that collected data represents a particular weapon type without revealing a detailed gamma spectrum of the weapon, which may in fact be classified. Even if the classified data can be kept private via an alternative representation, consistent correspondence between the classified and unclassified representations may reveal too much information about the weapon. As another example, the government may wish to utilize an information hiding mechanism to mitigate the concern of the private sector in providing proprietary information for national infrastructure protection.

Encryption alone cannot solve this problem. Additionally, certain data are prone to statistical variation, thus creating difficulties for consistent authentication results using standard digital authentication techniques. Gamma spectra are also examples of statistically variant data where measurements of the same sample with the same equipment will result in different spectra due to Poisson noise conditions.

Finally, public key cryptographic techniques are often useful in situations where one authenticating party seeks to convince multiple verifying parties or when the origination of data must be verifiable, thus providing non-repudiation. The present invention permits use of digital public key mechanisms to authenticate data prone to statistical variation and ability to hide data details while still proving the authenticity and integrity of the data.

Although the weapon inspection problem will be used as the primary exemplary application of the present invention, other applications exist with a similar problem set. For example, the use of biometrics (fingerprint, retina scan, voice patterns, etc.) to enable or authorize a certain function, such as entrance into a building, faces similar challenges. A biometric reading from the same individual using the same equipment will likely be slightly different each time. Moreover, the use of biometric information may have privacy implications that drive the need for hiding the detailed biometric information itself.

Generally speaking, any authentication process will have two steps. The first step is to initialize the authentication system by acquiring a reliable template of the item in question. In the weapon inspection application, this will be a representative weapon from the class of treaty-limited items. In the biometric application, initialization requires verification of the individual using information such as a birth certificate, driver's license, fingerprint, or deoxyribonucleic acid (DNA) sample, and acquisition of the initial biometric. The initialization step requires that the representative item (e.g., weapon or person) be certified to truly be a member of the class. This generally requires additional off-line inspection processes that will not be discussed further.

With the acquisition of an authentic template of monitored items, subsequent inspections can occur in the second part of the process. In the weapon authentication application, the basic problem is to make a class association as opposed to differentiating between individual weapons of the same class. In the biometric application, the original biometric is used as a template for subsequent authentication of the individual.

An approach developed for use in biometric identification utilizes error correction coding techniques. G. I. Davida, et al., "On Enabling Secure Applications Through Off-line Biometric Identification", Proceedings of the IEEE Symposium on Security and Privacy, Oakland, Calif. (May 1998). It uses majority coding to construct a template of a biometric that is known to vary between measurements. Majority coding takes a number of measurements (preferably odd) and assigns each bit of the template to the value that is most often represented in the measurements using a majority rule. The template is then encoded into a code vector with a specified amount of redundancy. The amount of redundancy and the encoding technique used determines how many bits can be corrected in the template. In other words, if a vector does not perfectly match any codeword (template), then the closest codeword (in a Hamming sense) is generally assigned. The distance between codewords is representative of the number of correctable bits as well. A similar method is employed in U.S. Pat. No. 6,038,315, to Strait, et al., entitled "Method and System for Normalizing Biometric Variations to Authenticate Users from a Public Database and that Ensures Individual Biometric Data Privacy."

During verification, the same majority coding technique is used to acquire a biometric representative from a number of measurements. Since majority coding is a bit-oriented technique, the idea is to use it to acquire a representative test biometric. The hope is that is it within a specified Hamming distance of the original biometric template. If the representative is close enough to the template, it can be decoded into the exact biometric using bounded distance decoding.

A speech scrambling invention uses a data hiding technique that is similar to the method described herein. V. Senk, et al., "A New Speech Scrambling Concept Based on Hadamard Matrices", *IEEE Signal Processing Letters* 4(6): 161-163 (June 1997). However, the present invention constrains the input signal via scaling and centering prior to permuted transformation and they propose no authentication of the output signal. Scaling and centering of the input signal allows strong statements about the security of the invention. Independent of the permutation key and input spectrum, the output of the constrained permuted transform is consistent with a realization of Gaussian white noise. Hence, the distribution of the components of the output signal is substantially non-informative about the input signal.

SUMMARY OF THE INVENTION

The present invention is of a method of and system for authenticating concealed and statistically varying multidimensional data, comprising: acquiring an initial measurement of an item, wherein the initial measurement is subject to measurement error; applying a transformation to the initial measurement to generate reference template data; acquiring a subsequent measurement of an item, wherein the subsequent measurement is subject to measurement error; applying the transformation to the subsequent measurement; and calculating a Euclidean distance metric between the transformed measurements; wherein the calculated Euclidean distance metric is identical to a Euclidean distance metric between the measurements prior to transformation. In one embodiment, the steps of applying the transformation generate data that is substantially indistinguishable from Gaussian white noise. The measurements are preferably normalized during the transformations, most preferably by centering and scale-transforming the measurements so that the mean and standard deviation are fixed. The measurements are preferably permuted, most preferably with an item of secret information such as a passcode and/or the results of a hash function of the passcode. The transformations preferably employ a linear transformation, most preferably with a transformation matrix with orthonormal columns, such as a normalized Hadamard matrix or a normalized matrix comprising Fourier coefficients with a cosine/sine basis. The linearly transformed data is preferably permuted, most preferably with an item of secret information such as a passcode and/or the results of a hash function of the passcode. The measurements may be biometric data, such as fingerprints, retinal scans, facial scans, hand geometry, spectral data, or voice data, with the reference template data being placed on a smart card to be carried by an individual from whom the biometric data was taken (the reference data on the smart card may also be compared with reference data held by the authenticator to confirm identicality). The measurements may be spectral data, such as weapons spectra. Pseudo-dimensions may be added to the measurements to enhance concealment.

The invention is also of a method of and system for concealing multidimensional digital input data and maintaining an ability to authenticate the concealed data, comprising: normalizing the input data; permuting elements of the normalized data; linearly transforming the normalized and permuted data with a transformation matrix; and permuting the linearly transformed data to create the concealed data; wherein the concealed data can be authenticated without conversion back into the input data. In another embodiment, normalizing comprises centering and scale-transforming the data so that the mean and standard deviation are fixed. Permuting the linearly transformed data can comprise employing an item of secret information, such as a passcode and/or the results of a hash function of the passcode. Linearly transforming can comprise employing a transformation matrix with orthonormal columns. Permuting the linearly transformed data preferably comprises employing an item of secret information, such as a passcode and/or the results of a hash function of the passcode. The concealed data is substantially indistinguishable from Gaussian white noise. The transformation matrix can comprise a normalized Hadamard matrix or a normalized matrix comprising Fourier coefficients with a cosine/sine basis. The input data may be biometric data, such as fingerprints, retinal scans, facial scans, hand geometry, spectral data, or voice data, to be authenticated with reference template data being placed on a smart card to be carried by an individual from whom the biometric data was taken (the reference data on the smart card may also be compared with reference data held by the authenticator to confirm identicality). The input data may be spectral data, such as weapons spectra. Pseudo-dimensions may be added to the input data to enhance concealment.

The present invention is additionally of a method of and system for concealing and authenticating statistically varying multi-dimensional data, comprising: acquiring a measurement of an item, wherein the measurement is subject to measurement error; applying a transformation to the measurement to substantially conceal the measurement; and authenticating the transformed measurement without removing concealment of the transformed measurement and without employing an error-correction algorithm.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

The present invention is of a system and method for hiding (encrypting) data while at the same time permitting authentication of the data while remaining in its encrypted form.

The goals of a solution for the problem of ensuring integrity of statistically variant data while maintaining privacy of the original data are twofold. First, the system must allow authentication (preferably, integrity, identification, and non-repudiation) of the source of the data. Secondly, the system solution must not reveal any usable information about the original source data.

The present invention involves the retention of information in the original signal in a statistical sense while provably hiding the original data. This approach is very non-invasive in terms of allowing users to utilize the same statistical authentication measures and evaluations on the measured signal that are used without any information hiding. The preferred method for hiding the original data involves permuting the original signal, applying a linear transformation, and then permuting the transformed signal. Through this process, the output signal becomes essentially indistinguishable from Gaussian white noise. The individual elements of the output signal or vector are completely uncorrelated.

In weapons monitoring, the host country is responsible for the inspected item while other parties to a particular treaty act as inspectors. The goal of weapons monitoring is to distinguish between different classes of weapons so that certain treaty-limited items can be tightly controlled.

In the two-step authentication process, the first step is to acquire a reliable template of the item under inspection. This step is performed only once for each weapon class and results in a template or reference signal. Step two of the authentication process involves acquiring a measurement of the inspected item for comparison to the reference signal. In the weapon authentication application, a statistically variant signal is recorded and measured in similarity to the prerecorded template. For example, the weapon's gamma radiation spectrum must be statistically similar enough to a weapon-class template to be considered a member of the class. This process is shown in FIG. 1.

Figure 1:
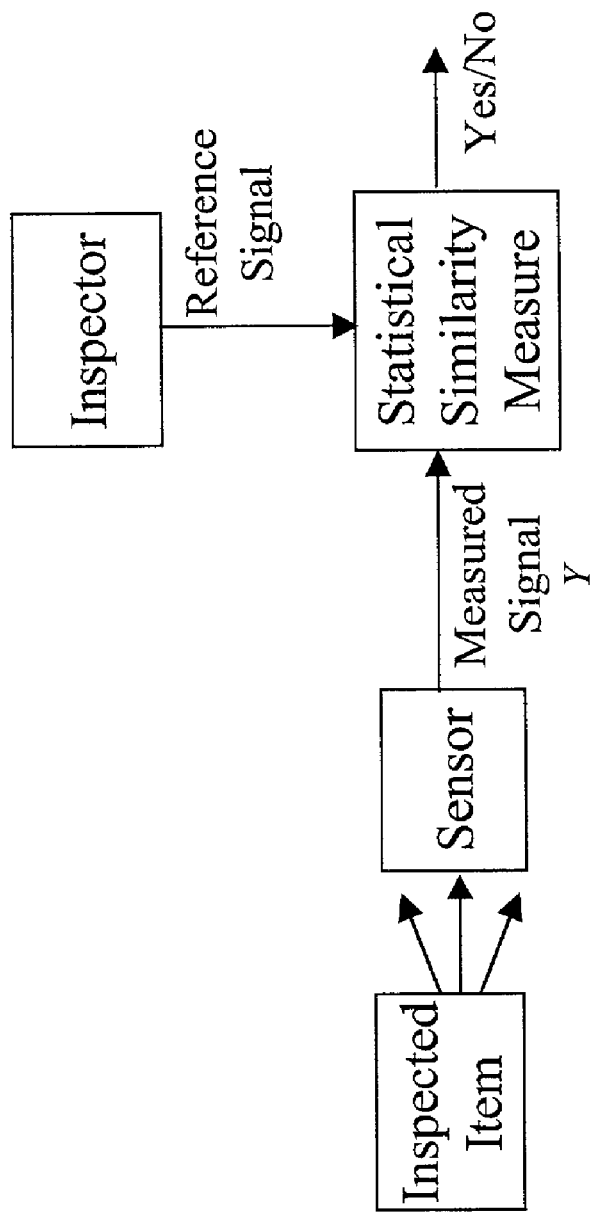
FIG. 1 is a diagram of a prior art method of authenticating a statistically variant signal.
Figure 2:
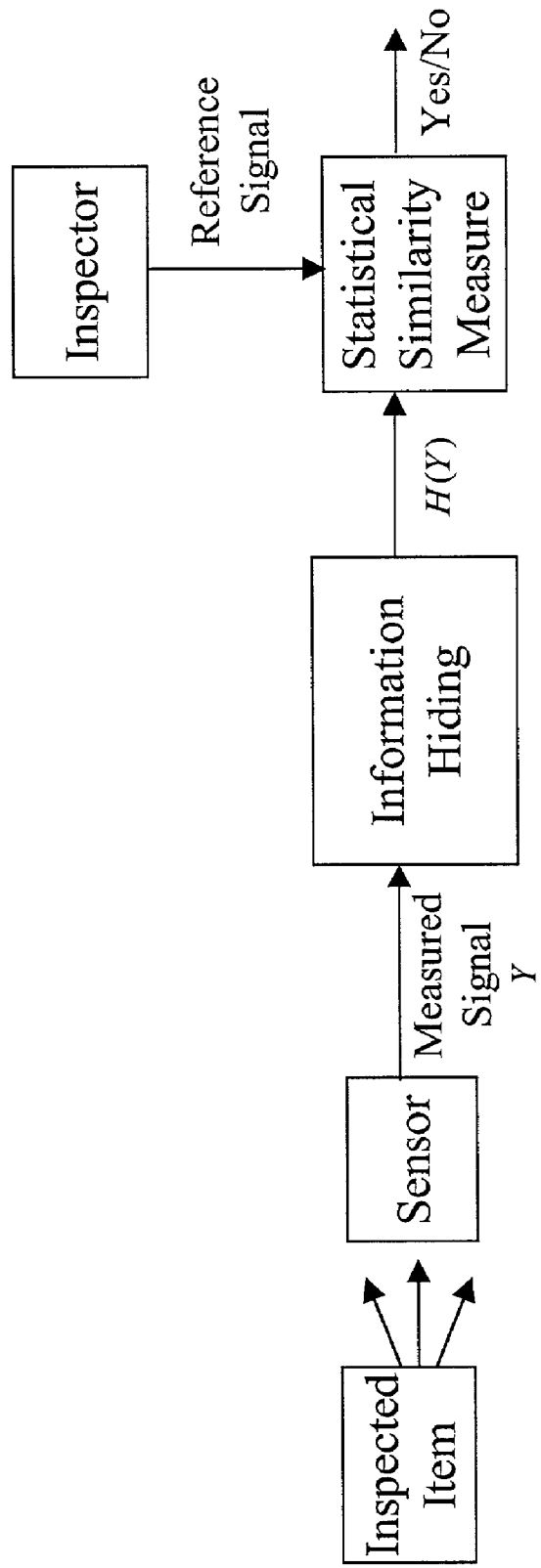
FIG. 2 is a diagram of the method of the invention for authenticating a statistically variant signal that has been concealed.

Given that the process shown in FIG. 1 provides authentication of the inspected item, information hiding of the original data signal must be added to qualify as an acceptable, secure system solution. The system of the invention shown in FIG. 2 provides information hiding of the original signal and outputs a signal that can be handled in much the same way as the original measured signal without information hiding. This is important because it may be possible to accommodate already familiar techniques for measurement of statistical similarity.

Figure 3:
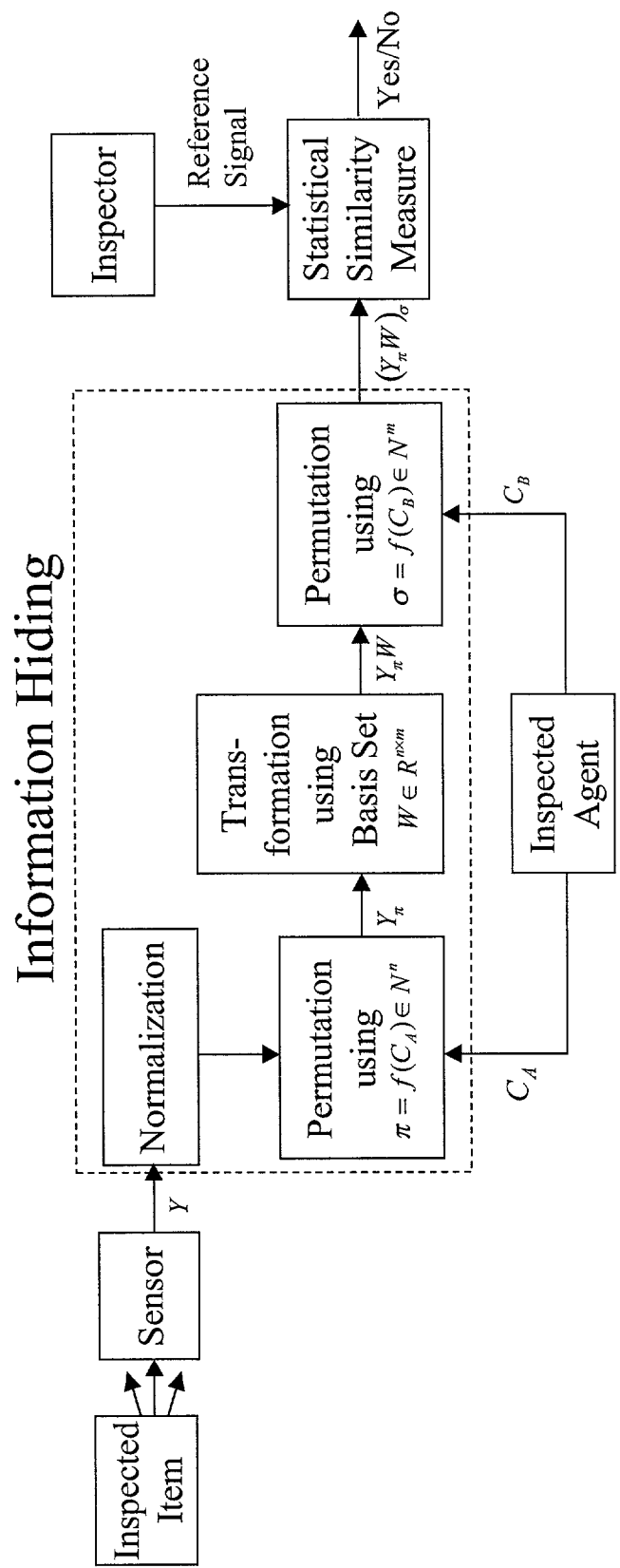
FIG. 3 is a diagram of the embodiment of FIG. 2.

The preferred embodiment of the invention is referred to herein as the Permutation-Transformation-Permutation (PTP) solution to information hiding and, as its name implies, performs three operations to the measured signal, after which the signal is completely unrecognizable from its original content. FIG. 3 shows this system in block diagram form.

The purpose of the permutation functions $\pi$ and $\sigma$ is to scramble the signal Y such that $(Y_\pi W)_\sigma$ can be made public without risk of revealing Y. Permutation operations are easily reversible if the permutation is known. Therefore $\pi$ and $\sigma$ must be kept secret. However, the root permutation function f( ) can be standard secure hash function which need not be kept secret. Passcode $C_A$ and $C_B$, uniquely associated with the Inspected Item, is entered by the Inspected Agent. Passcode $C_A$ ($C_B$) is hashed and separated into n(m) equally sized pieces, each piece representing a numeric value. The pieces are ranked numerically and the ranking becomes the permutation $\pi$ ($\sigma$).

For example, let a passcode of 1234 hash to the following 32-bit digest.

$$f(1234) = 9F2735A7$$

If the size of the permutation is 8, then each hex digit of f(1234) is ranked as follows to form the permutation. Note that ties can be handled in a predetermined or random manner.

| f(1234)     | = | 9 | F | 2 | 7 | 3 | 5 | A | 7 |
|-------------|---|---|---|---|---|---|---|---|---|
| Permutation | = | 6 | 8 | 1 | 4 | 2 | 3 | 7 | 5 |

Concerning transformation, the first task of the monitoring equipment is to produce a digital representation of the inspected item. This information, referred to as the Measured Signal (Y), is private and not to be released to, or be derivable by, the Inspector. The Measured Signal is transformed via a linear transformation matrix, W, such that the new signal is YW. If the transformation signal matrix W were kept private as well, then this step could accomplish the complete information hiding solution. However, if W is made public, then Y could be derived from YW. Therefore, permutations are applied before and after the transformation of Y.

The PTP method of the invention preferably operates as follows:

$$Y \rightarrow Y_\pi \rightarrow Y_\pi \cdot W \rightarrow (Y_\pi \cdot W)_\sigma$$

where:

Y is the n-dimensional row vector $\{Y_1, Y_2, \ldots, Y_n\}$ of measurements (typically comprising a spectrum).

$\pi$ is a permutation of the integers from 1:n that is unique to a particular verification class. A verification class consists of 1 or more physical units/items/individuals. For example, in the degenerate case, a verification class could be a single individual.

W is an n×m transformation matrix with orthonormal columns that transforms the vector of measurements to m≦n latent variables.

$\sigma$ is a permutation of the integers from 1:m that is unique to a particular verification class.

Step 1: Center and scale-transform Y such that the mean of Y is 0 and the standard deviation of Y is 1. The scale transformation provides data normalization that renders the shape of the spectrum as being the sole identifying characteristic of a class.

Step 2: Permute the elements of Y:Y→$Y_\pi$. The idea is to permute the elements of Y before applying the linear transformation (W) so that each latent variable is constructed/composed differently for each verification class. The elements of Y are randomly re-ordered.

Step 3: Linearly transform the permuted spectrum via W:$Y_\pi$→$Y_\pi \cdot W$. The orthonormality of W implies that $$\sum_{i=1}^{n} w_{ij}^2 = 1, \forall j \tag{1}$$

Other characteristics of the columns of W are assumed as follows:

$$w_{i1} = \frac{1}{\sqrt{n}}, \forall i \tag{2}$$

$$\sum_{i=1}^{n} w_{ij} = 0, \forall j>1 \tag{3}$$

For a given spectrum, one now has a sample space of n! unique sets of equally likely m-vectors (latent variables) that comprise T=Y$_\pi$·W. The particular realization of T that arises (at random) depends on the distribution of intensities within Y and the permutation π (not, however, on the natural ordering of Y, which Step 1 took care of). Due to (2) and the fact that the mean of Y is zero, T$_1$=0. In general, due to characteristics (1) and (3), one can claim that for the j$^{th}$ element in T (T$_j$), $$E(T_j)=0 \; \forall_{j>1}$$

$$\text{Var}(T_j)=1 \; \forall_{j>1}.$$

Details concerning verification of this claim may be discerned from E. L. Lehmann, *Nonparametrics: Statistical Methods Based on Ranks* at 334, Holden-Day (1975).

At this point, there is an association of the latent variable with its particular basis (a column of W). Depending on the size of m and the particular basis set that is used (e.g., m=n), T may be used to extract information about Y$_\pi$ (e.g., via W$^{-1}$). From Y$_\pi$, one might obtain information about Y. Thus, one final step is needed to completely hide the original spectrum.

Step 4: Permute T: T→U=T$_\sigma$ or Y$_\pi$·W→(Y$_\pi$·W)$_\sigma$. Permute the latent variables. This step hides the association of a specific latent variable with a column of W. At this point one has broken the association between each column of W and its corresponding latent variable. For this step alone the sample space is of size m!. The whole process (Steps two to four) defines a sample space of up to n!×m! equally likely sets of permuted latent variables for each spectrum. The actual number of distinct sets of latent variables depends on W. The random permutation (σ) renders the distributions of the elements of U as mutually indistinguishable or interchangeable. Thus, over the class of possible permutations (π and σ) for a particular spectrum, the elements of U are identically distributed. Note that as an alternative to this second permutation, the T's may be sorted rather than permuted. While this will result in a simpler procedure, the problem is that such a procedure will allow many other input spectra to be incorrectly authenticated (many to 1 mapping) as only the distribution of T's is authenticated (as opposed to the distribution and order of T's).

The restrictions on W are that its columns and rows must be mutually orthonormal. In addition, it is preferred to require $$\sum_{i=1}^{n} w_{ij} = 0, \forall_{j>1} \text{ with } w_{i1} = \kappa, \forall_i.$$

There are thus a large number of candidates for W. Two preferred possibilities for W are discussed in detail here.

The first possibility discussed is a normalized Hadamard matrix. A Hadamard matrix, H, has elements H$_{ij}$∈{−1,+1}. The rows and columns of H are orthogonal. The order of a Hadamard matrix, n, is restricted to 1, 2, or 4n where n∈Z$^+$. Thus, for The second possibility concerns Fourier coefficients with a cosine/sine basis. Assume that the spectrum is size n, where n is even (there is a similar development when n is odd). One possible basis set consists of $$f_1(t) = \frac{1}{\sqrt{2}}$$

$$f_p(t) = \cos\left(\frac{2 \cdot \pi \cdot (p-1) \cdot t}{n}\right), \text{ for } p \in \{2, 3, \ldots, n/2\},$$

$$f_{n/2+1}(t) = \frac{1}{\sqrt{2}} \cdot \cos(\pi \cdot t), \text{ and}$$

$$f_{n/2+p}(t) = \sin\left(\frac{2 \cdot \pi \cdot (p-1) \cdot t}{n}\right), \text{ for } p \in \{2, 3, \ldots, n/2\},$$

all defined on t={0, 1, 2, . . . , n−1}. Let the j$^{th}$ column of F be defined by {f$_j$(0), f$_j$(1), . . . , f$_j$(n−1)}. The columns of F are orthogonal with $$\sum_{i=1}^{n} f_{ij}^2 = \frac{n}{2}, \forall_j \text{ and } \sum_{i=1}^{n} f_{ij} = 0, \forall_{j>1}.$$

In order to obtain columns with length 1, one normalizes $$F: W = \frac{1}{\sqrt{\frac{n}{2}}} F_n.$$

As in the case of the Hadamard basis set, note that the elements of the first column are constant. Since $\bar{Y}=0$, one latent variable will be zero by construction.

Distribution of PTP Output Elements

This application next discusses the distribution of the PTP output elements both within and across verification classes. This discussion is important because it provides a foundation for demonstrating the difficulties in distinguishing verification classes via the PTP output. The first part of this section deals with the limiting normal distribution of the PTP output as n→∞. The second part of this section illustrates that the normal distribution suggested via the asymptotic analysis is a very good approximation for n≥100.

First, assume a fixed input vector Y, such that its elements have mean 0 and variance 1. Recall that T$_j$=w$_{1j}$Y$_{\pi_1}$+w$_{2j}$Y$_{\pi_2}$+ . . . +w$_{nj}$Y$_{\pi_n}$, where Y$_{\pi_i}$ is the i$^{th}$ element of Y$_\pi$ and w$_{ij}$ is the ij$^{th}$ element of W. In cases where the first column of W is a constant (e.g., see Hadamard or cosine/sine constructions for W), T$_1$=0 since the elements of the first column of W are identical and $\bar{Y}=0$. Thus, T$_1$ is not informative, so one really has only n−1 informative outputs. However, for $$j > 1, \bar{w}_{\cdot j} = 0 \text{ and } \sum_{i=1}^{n} (w_{ij} - \bar{w}_{\cdot j})^2 = 1.$$

Over the sample space populated by the permutation π on the single spectrum Y, $E(Y_{\pi_j})=0$ and $Var(Y_{\pi_j})=1$. First, fix j. Let $$T_j^n = \sum_{k=1}^{n} X_k \text{ and } X_k = w_{\rho_k j} Y_{\pi_k} \cdot X = \{X_k; k = 1:n\}$$

is a set of random variables derived from the sample space populated by the permutation π and Y and the permutation ρ on the $j^{th}$ column of W. Note that the elements of X are exchangeable. S. Karlin, et al., *A Second Course in Stochastic Processes* at 454, Academic Press (1981). Note that $$E(X_k) = 0 \text{ and } E(X_k^2) = \frac{1}{n}.$$

Suppose that $\chi_n=\{X_k, k=1:n\}$ defines a sequence indexed by n. Assume the regularity conditions $E|X_1|^3 < \infty$, $E(X_1 \cdot X_2)=o(n^{-2})$, $E(X_1^2 \cdot X_2^2) \to n^{-2}$, and $E|X_1|^3=o(n^{-1})$.

Due to the exchangeability of the elements in X, $$Z_j^n = \frac{T_j^n - E(T_j^n)}{\sqrt{Var(T_j^n)}}$$

converges to a Gaussian (0,1) random variable as n→∞. Y. S. Chow, et al., *Probability Theory, Independence, Interchangeability, Martingales* 3d ed., at 336, Springer-Verlag (1997).

Furthermore, since $E(T_j^n)=0$ and $Var(T_j^n)=1$ $\forall_{j=1,\ldots,m}$, $T^n$ converges to a Normal (0,1) random variable. So in the limit for a fixed spectrum, the $T_j$ are identically and normally distributed over the sample space of the permutations of Y. Furthermore, the $T_j$ are uncorrelated since they are derived via an orthogonal basis (W). Uncorrelated random variables that are Gaussian distributed are independent. Thus, the vector $T=[T_1, T_2, \ldots, T_n]$ converges to Gaussian white noise.

With regard to satisfying the regularity conditions, one has to consider both the transformation matrix (W) and the input data vector (Y). For example, assume that W is a Hadamard matrix. In this case, for j>1:

1. $E_{i \neq k}(w_{ij} \cdot w_{kj}) = \frac{2}{n \cdot (n-1)} \cdot \sum_{i>k} \sum w_{ij} \cdot w_{kj} = -\frac{1}{n \cdot (n-1)}$ and 2. $E_{i \neq k}(w_{ij}^2 \cdot w_{kj}^2) = \frac{2}{n \cdot (n-1)} \cdot \sum_{i>k} \sum w_{ij}^2 \cdot w_{kj}^2 = n^{-2}.$ Thus, is this case, the regularity conditions $E(X_1 \cdot X_2)=o(n^{-2})$ and $E(X_1^2 \cdot X_2^2) \to n^{-2}$ imply that 1. $E(Y_1 \cdot Y_2)=o(1)$ and 2. $E(Y_1^2 \cdot Y_2^2) \to 1.$ The other regularity conditions $E|X_1|^3 < \infty$ and $E|X_1|^3=o(n^{-1})$ require a certain amount of variety in the input spectrum. For example, in the gamma spectrum example, the spectral mass should be well spaced out and not concentrated at a few channels.

Spectral measurements (i.e. spectral data) may consist of electromagnetic spectra, including, but not limited to, gamma spectra, X-ray spectra, ultra-violet spectra, visible spectra, near-infrared spectra, and infrared spectra. The spectral data can originate from a radioactive source (e.g., from a weapon), or from biometric data (e.g., electromagnetic radiation reflected or emitted from a person's skin).

The above result holds for any input spectrum Y and transformation matrix W consistent with the above regularity conditions and the specifications for W. The result does not depend on the verification class. Thus, in the limit for such spectra, T converges in distribution to Gaussian white noise as n→∞. The noise realization depends on Y and the permutation, π. Thus, as n→∞, the distributions of T are indistinguishable across input spectra.

The second permutation, σ, simply permutes the elements of T and does not affect its distribution. Thus, the final PTP output (U) converges almost surely to Gaussian white noise as n→∞ so that the distributions of U are indistinguishable across input spectra within and across classes.

Figure 9:
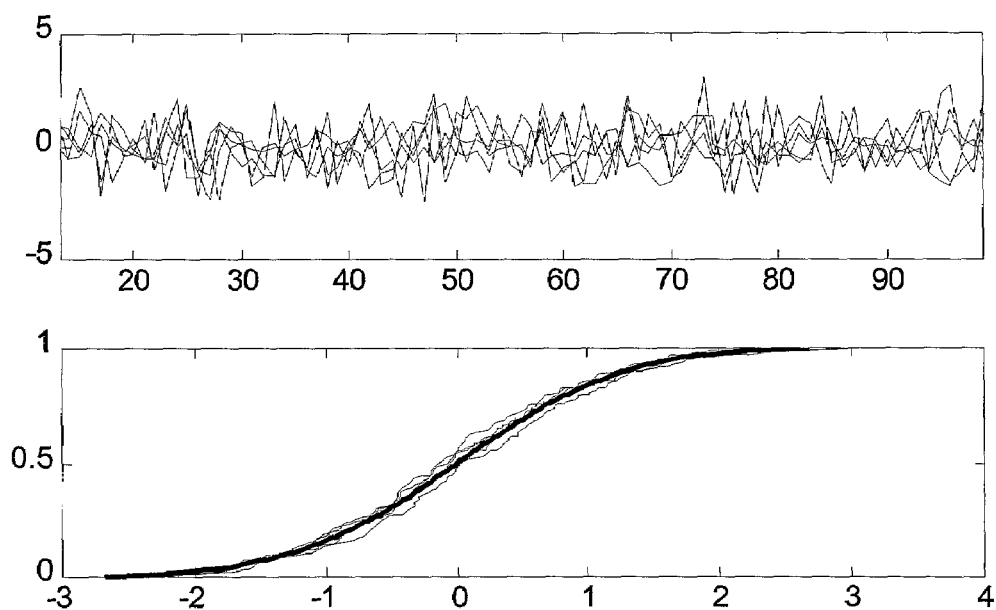
FIG. 9 summarizes invention realizations derived from a single input spectrum.

Next, this application demonstrates the distributional similarity of PTP output across permutations and a variety of simulated gamma spectra with n=128 channels. FIG. 9 displays the PTP output from a single input spectrum with five different sets of permutations. The upper portion of FIG. 9 displays the five realizations of output while the bottom portion of the figure displays the empirical cumulative distribution functions of the PTP elements associated with each realization. The standard Normal (mean=0 and standard deviation=1) cumulative distribution is superimposed as a bold black line for comparison.

Figure 10:
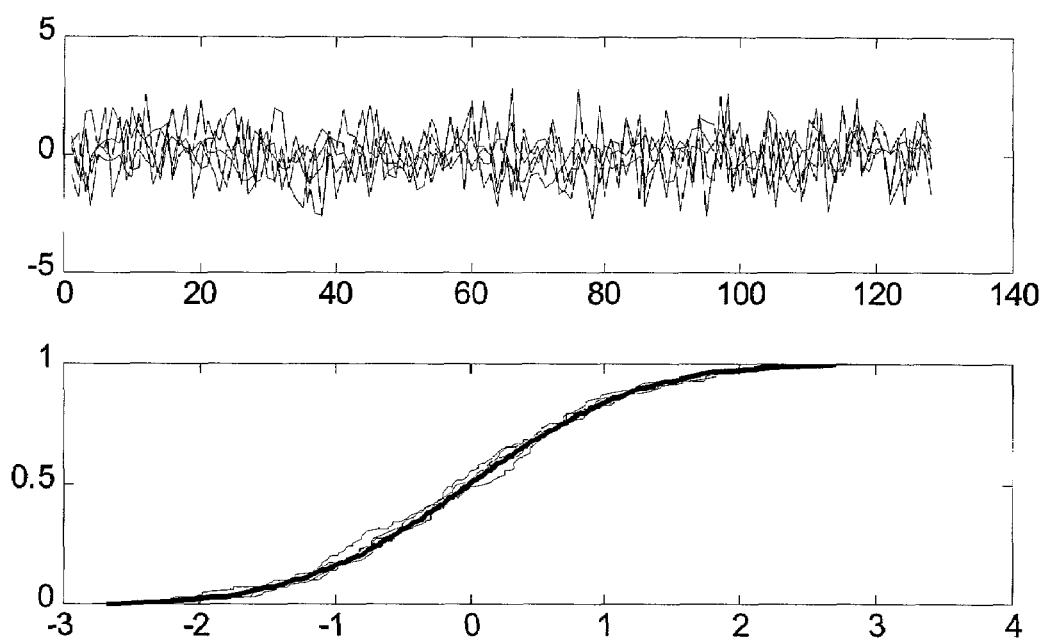
FIG. 10 summarizes invention realizations derived from different input spectra, each spectrum with a unique permutation set.

FIG. 10 displays summary of PTP outputs derived from five different input spectra, each associated with unique sets of permutations. A comparison of FIGS. 9 and 10 shows that the distributions for a fixed input (but different permutations) differ by as much as the distributions associated with a variable input. At a macro-level the distributions of PTP elements are similar and are each indistinguishable from a standard Normal distribution.

For a more formal assessment of normality, PTP output spectra were computed based on 1000 permutation sets for each of the 30 simulated gamma spectra from Example 1, below. This gives rise to 30000 PTP output spectra, each of dimension n=128. The Kolmogorov-Smirnov statistic, $D_n=\max|F_n(x)-F(x)|,$ was computed for each output spectrum. R. B. D'Agostino, et al., *Goodness-of-fit Techniques*, Marcel Dekker (1986). This statistic measures the maximum distance between the empirical cumulative distribution function (c.d.f.) of the elements of a specific PTP output spectrum ($F_n(x)$) and the c.d.f of a target distribution (F(x)). Small values for $D_n$ are indicative of a good match between $F_n(x)$ and F(x). In this case, the target distribution is the standard normal distribution. The distribution of $D_n$ was computed for each of the 30 simulated gamma spectra. Various percentiles of $D_n$ are summarized below in Table 1. If the distribution giving rise to $F_{n=128}(x)$ is F(x), then the expected values of the $50^{th}$, $75^{th}$, $90^{th}$, $95^{th}$, and $99^{th}$ percentiles of $D_{n=128}$ are 0734, 0.0902, 0.1078, 0.1202, and 0.1441 respectively. In general, the observed percentiles of $D_{n=128}$ are less than their expected values, indicating a better than expected match between $F_n(x)$ and $F(x)$. The exception to this is the $99^{th}$ percentile of $D_{n=128}$. This suggests that the difference between $F_n(x)$ and $F(x)$ is occasionally larger than would be expected if the distribution giving rise to $F_{n=128}(x)$ is $F(x)$. Almost all PTP outputs derived from the simulated gamma spectra are indistinguishable from Gaussian white noise.

TABLE 1

Distribution of $D_n$ by Input Spectrum

| Spectrum | $50^{th}$ Percentile | $75^{th}$ Percentile | $90^{th}$ Percentile | $95^{th}$ Percentile | $99^{th}$ Percentile |
|---|---|---|---|---|---|
| 1 | 0.0629 | 0.0763 | 0.0944 | 0.1076 | 0.1760 |
| 2 | 0.0644 | 0.0779 | 0.0934 | 0.1043 | 0.1358 |
| 3 | 0.0635 | 0.0779 | 0.0928 | 0.1046 | 0.1782 |
| 4 | 0.0632 | 0.0762 | 0.0918 | 0.1048 | 0.1931 |
| 5 | 0.0622 | 0.0757 | 0.0903 | 0.1034 | 0.1870 |
| 6 | 0.0630 | 0.0769 | 0.0936 | 0.1087 | 0.1806 |
| 7 | 0.0542 | 0.0649 | 0.0809 | 0.0962 | 0.2064 |
| 8 | 0.0542 | 0.0649 | 0.0810 | 0.0988 | 0.2210 |
| 9 | 0.0556 | 0.0665 | 0.0816 | 0.1009 | 0.2215 |
| 10 | 0.0555 | 0.0663 | 0.0851 | 0.1048 | 0.2882 |
| 11 | 0.0534 | 0.0640 | 0.0779 | 0.0936 | 0.2146 |
| 12 | 0.0536 | 0.0651 | 0.0810 | 0.0985 | 0.2862 |
| 13 | 0.0567 | 0.0705 | 0.0952 | 0.1396 | 0.1875 |
| 14 | 0.0571 | 0.0696 | 0.0897 | 0.1136 | 0.1912 |
| 15 | 0.0574 | 0.0711 | 0.0905 | 0.1222 | 0.1730 |
| 16 | 0.0565 | 0.0695 | 0.0890 | 0.1121 | 0.1969 |
| 17 | 0.0577 | 0.0710 | 0.0912 | 0.1136 | 0.1706 |
| 18 | 0.0568 | 0.0698 | 0.0903 | 0.1195 | 0.1813 |
| 19 | 0.0565 | 0.0667 | 0.0842 | 0.0986 | 0.1905 |
| 20 | 0.0578 | 0.0691 | 0.0883 | 0.1097 | 0.2620 |
| 21 | 0.0568 | 0.0689 | 0.0879 | 0.1091 | 0.1935 |
| 22 | 0.0573 | 0.0704 | 0.0860 | 0.0992 | 0.1640 |
| 23 | 0.0569 | 0.0695 | 0.0885 | 0.1059 | 0.2094 |
| 24 | 0.0569 | 0.0692 | 0.0837 | 0.0961 | 0.1662 |
| 25 | 0.0700 | 0.0826 | 0.0986 | 0.1086 | 0.1221 |
| 26 | 0.0695 | 0.0837 | 0.0980 | 0.1070 | 0.1217 |
| 27 | 0.0686 | 0.0825 | 0.0957 | 0.1027 | 0.1194 |
| 28 | 0.0689 | 0.0835 | 0.0977 | 0.1059 | 0.1200 |
| 29 | 0.0697 | 0.0826 | 0.0964 | 0.1054 | 0.1215 |
| 30 | 0.0686 | 0.0836 | 0.0983 | 0.1106 | 0.1245 |

In general, characteristics that influence the degree to which the PTP output elements resemble Gaussian white noise include the dimension of the spectrum n, and the distribution of intensities associated with the input spectrum, Y. For a fixed spectral shape, the PTP outputs tend towards Gaussian white noise as n increases. If the input spectral intensities are well distributed and not concentrated at a few pixels, the PTP output is likely to resemble Gaussian white noise. Such spectra are said to be well behaved.

So far this discussion has focused on the distribution of PTP output elements in a gross sense. For finite n, in the case of simulated gamma spectra used as input, it has been shown that it is difficult to distinguish the resulting PTP output from Gaussian white noise. However, at a micro level, the distribution of PTP output elements does depend on the input spectrum that is to be transformed. For a fixed input spectrum over all possible permutations ($\pi$ and $\sigma$), there is a finite set of values possible in the PTP output. In this regard, the PTP output based on a sine/cosine construction is superior to output derived from a Hadamard-constructed PTP because the finite set of values in the former case is larger than the set of possibilities derived from the later case. The more limited set of possibilities in the case of the Hadamard construction is due to the restricted set of coefficients available in a Hadamard matrix (+1 or −1). The set of possible PTP output values varies from spectrum to spectrum. However, the variation of spectra within a class (e.g., due to unit-to-unit variation and measurement error) broadens the set of possible output elements considerably within a class.

Efficacy of the PTP Method for Data Hiding

The efficacy of the PTP method for data hiding is described in two contexts. In the first context, this application discusses the ability of the PTP method to hide Y given that an adversary has a single output spectrum from a given class. In the second context, this application discusses some possible vulnerabilities of the PTP method when an adversary has multiple output spectra from the same class.

Single Output Spectrum

The second random permutation ($\sigma$) destroys any structure in the PTP output (U) so that the order of the elements of an output spectrum provides no information regarding the characteristics of the input spectrum. All residual information about Y within U is localized to the distribution (as a whole) of values within U. Thus, the information-containing aspect of U is limited to the distribution of its elements.

However, assuming that the candidate spectra are well behaved, the distributions of the elements of the U are approximately the same regardless of the particular spectrum that is transformed. In the limit, as $n \to \infty$, the elements of U are independently and identically distributed according to a Normal distribution with zero mean and variance equal to 1 (Gaussian white noise). Thus, in this limiting case and without knowledge of $\pi$ and $\sigma$, a single PTP-output is completely uninformative about the character of the input spectrum (Y). This is the fundamental basis for claiming that the PTP method is an effective data-hiding mechanism.

In summary, the PTP transformation makes the distribution (in a statistical sense) of possible output vectors from one class indistinguishable from the distribution of possible output vectors from another class. The PTP transformation produces output that is essentially indistinguishable from Gaussian white noise. For a particular input spectrum there is a huge number of possible realizations of this Gaussian white noise process (e.g., when W is a normalized Hadamard matrix obtained by a standard construction there at least n! possible realizations). The uniqueness of the output for a particular class is provided by the combination of the input spectrum, the input permutation, and the output permutation.

Despite the evidence about the lack of information concerning Y via U, it is interesting to consider possible ways to attack the PTP scheme (i.e., gain information about Y). A brute force attack would be to invert U via all possible permutations in conjunction with $W^{-1}$. There are at least two problems with this attack. First, the number of possible permutations could be enormous. It is believed that it would be computationally infeasible to compute all permutations for reasonably large n and m (e.g., $128! > 10^{200}$).

Figure 11:
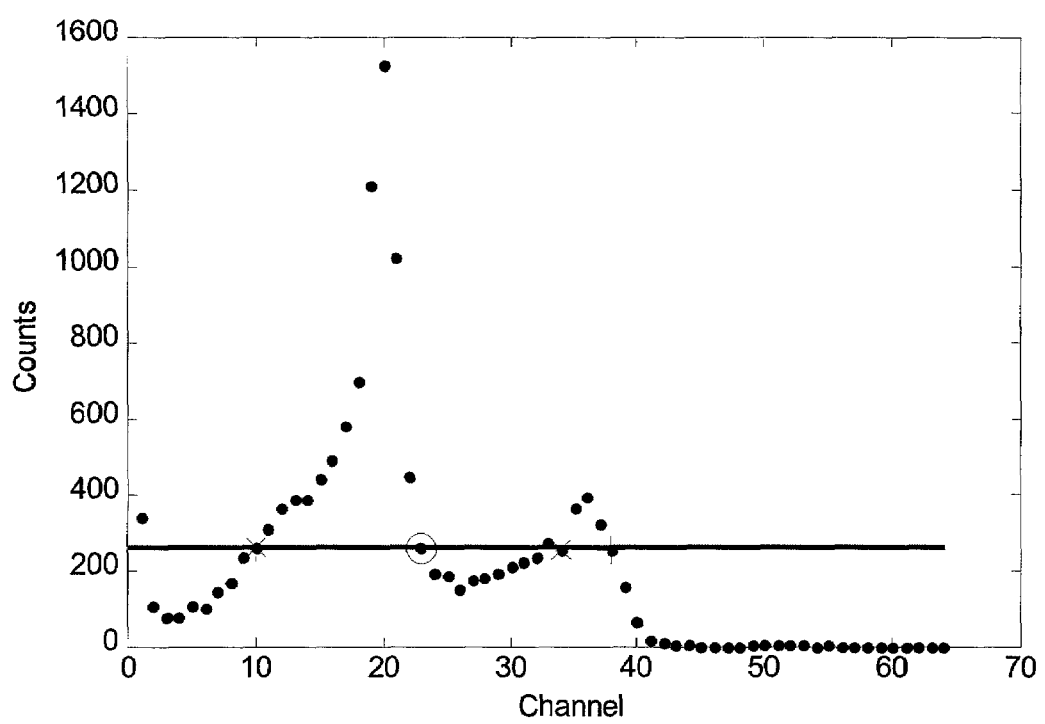
FIG. 11 illustrates a simulated gamma spectrum.
Figure 12:
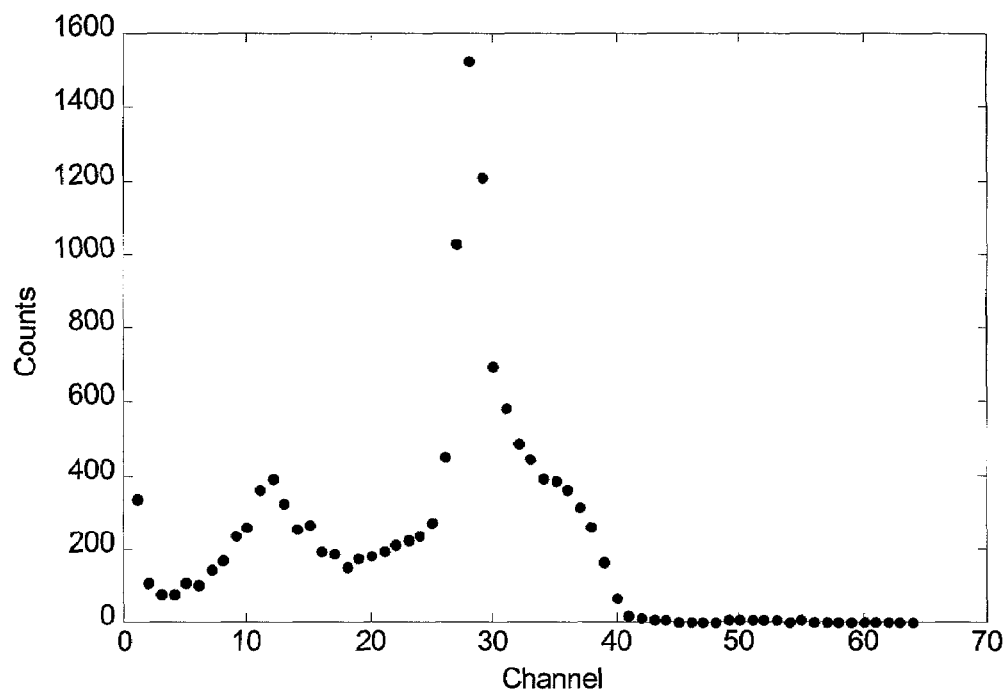
FIG. 12 illustrates a feasible solution of the original gamma spectrum, according to the invention.

The second problem is subtler. Suppose one were able to compute all possible versions of Y given U. Out of the huge number of possibilities for Y, one can conjecture that just by chance there could be a very large number of feasible solutions. One can conjecture that an attacker would have great difficulty in identifying the true value of Y from the feasible solutions. For example, FIG. 11 displays the first 64 channels of a simulated gamma spectrum. Superimposed on this spectrum is a fixed line at 260 counts. Let S1 be the sub-spectrum from the pixel denoted by a '*' to the pixel denoted by a 'o'. Let S2 be the sub-spectrum from the pixel denoted by a 'o' to the pixel denoted by a 'x'. Let S3 be the sub-spectrum from the pixel denoted by a 'x' to the pixel denoted by a '+'. The count values of the 4 highlighted pixels are the same except for measurement error. The 3 sub-spectra (S1, S2, and S3) can be interchanged and reversed to form $2^3 \cdot 3!$ spectra that have an underlying smooth nature (hence possible feasible) and would be equally likely solutions for Y given U that is derived from the true Y. FIG. 12 displays one such result obtained by exchanging S1 and S3 and reversing S1. Note that the construction (e.g., isotopic composition) of systems giving rise to these spectra would be significantly different. There are numerous other ways to develop feasible spectra.

Continuing with the notion that one could compute all possible versions of Y given U, a proposed attack involves finding the "smoothest" version of Y and using that version as the solution. To formalize, suppose that one has been able to reduce the candidate solution set to X, which is a permutation of the true input vector. Consider the objective function:

$$D = \sum_{i=1}^{n} (Y_{i+1} - Y_i)^2,$$

where $Y=X\_$ is a permutation of X. The permutation of X that minimizes D produces a monotone non-decreasing (or non-increasing) set of values for Y (e.g., $Y_i = X_{(i)}$). This can easily be proved by induction. The point is that the use of smoothness as a singular criterion for finding the true input vector may not be useful.

Multiple Output Spectra

Suppose that multiple output spectra from a single class are available to an adversary who is trying to obtain class-specific information about the input spectra. To formalize, consider the following two measurement error models.

Model 1: $Y=y+\delta$ and $U=u+\epsilon$

1. Y is the input spectrum as measured (not accessible by host or adversary).
2. y is an idealized input spectrum that is perfectly repeatable within a class.
3. $\delta$ is the vector difference between the actual input spectrum and the idealized class-specific spectrum.
4. $U=(Y_\pi \cdot W)_\sigma$ is the public output of the PTP procedure applied to Y.
5. $u=(y_\pi \cdot W)_\sigma$ is the hypothetical output of the PTP procedure applied to y.
6. $\epsilon=(\delta_\pi \cdot W)_\sigma$ is the hypothetical output of the PTP procedure applied to $\delta$.

Note that the only public observable is U (the output spectrum).

For this discussion, assume that Y is centered and scaled such that $YY^T=1$ and $\overline{Y}=0$. Also assume that W is n by n (i.e. there is no dimension reduction). Other assumptions are made concerning the elements of $\delta$, denoted by $\delta_.$ where $i=1, 2, \ldots, n$. These assumptions are:

$$E(\delta_.)=0 \text{ and } Var(\delta_.)=\sigma_\delta^2,$$

where the sample space spans all pixels of spectra within the same class. This broad sample space is considered due to the permutation, $\pi$. It follows that $E(\delta_. \delta_.^T)=n \cdot \sigma_\delta^2$. Note that $\sigma_\delta^2$ could depend on the class and/or measurement conditions.

In certain limits (e.g., well-behaved Y with large n), U is indistinguishable from Gaussian white noise (independent Gaussian elements with mean 0 and variance 1).

Via similar conditions on $\delta$, one can argue that $\epsilon$ is indistinguishable from Gaussian white noise (elements with mean 0 and variance, $$\sigma_\epsilon^2 = \frac{1}{n} \cdot \delta \delta^T \bigg).$$

By difference, it follows that u is indistinguishable from a Gaussian white noise process with zero mean and variance, $1-\sigma_\epsilon^2$.

Multiple observations of U for a certain class might be used to estimate $\sigma_\epsilon^2$ which can in turn be used to estimate $\sigma_\delta^2$. For example a reasonable estimate of $\sigma_\epsilon^2$ is $$\hat{\sigma}_\epsilon^2 = \sqrt{\frac{1}{(T-1) \cdot n} \cdot \sum_{t=1}^{T} \sum_{i=1}^{n} (U_{ti} - \overline{U}_{\cdot i})^2},$$

where T is the number of observations and $\overline{U}_{\cdot i}$ is the average value of the $i^{th}$ pixel over the T observations. Based on $\hat{\sigma}_\epsilon^2$, a good estimate of $\sigma_\delta^2$ is $\hat{\sigma}_\delta^2 = \hat{\sigma}_\epsilon^2$. Thus, multiple observations of U can provide information on $Var(\delta_i)$, which is a gross measure of the repeatability of Y across pixels and spectra.

Figure 13:
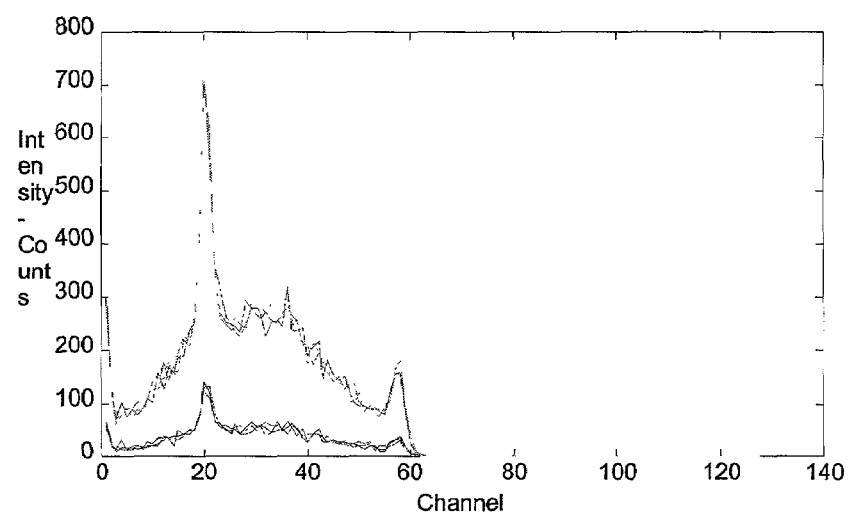
FIG. 13 illustrates simulated spectra with counting times of X and 5X.
Figure 14:
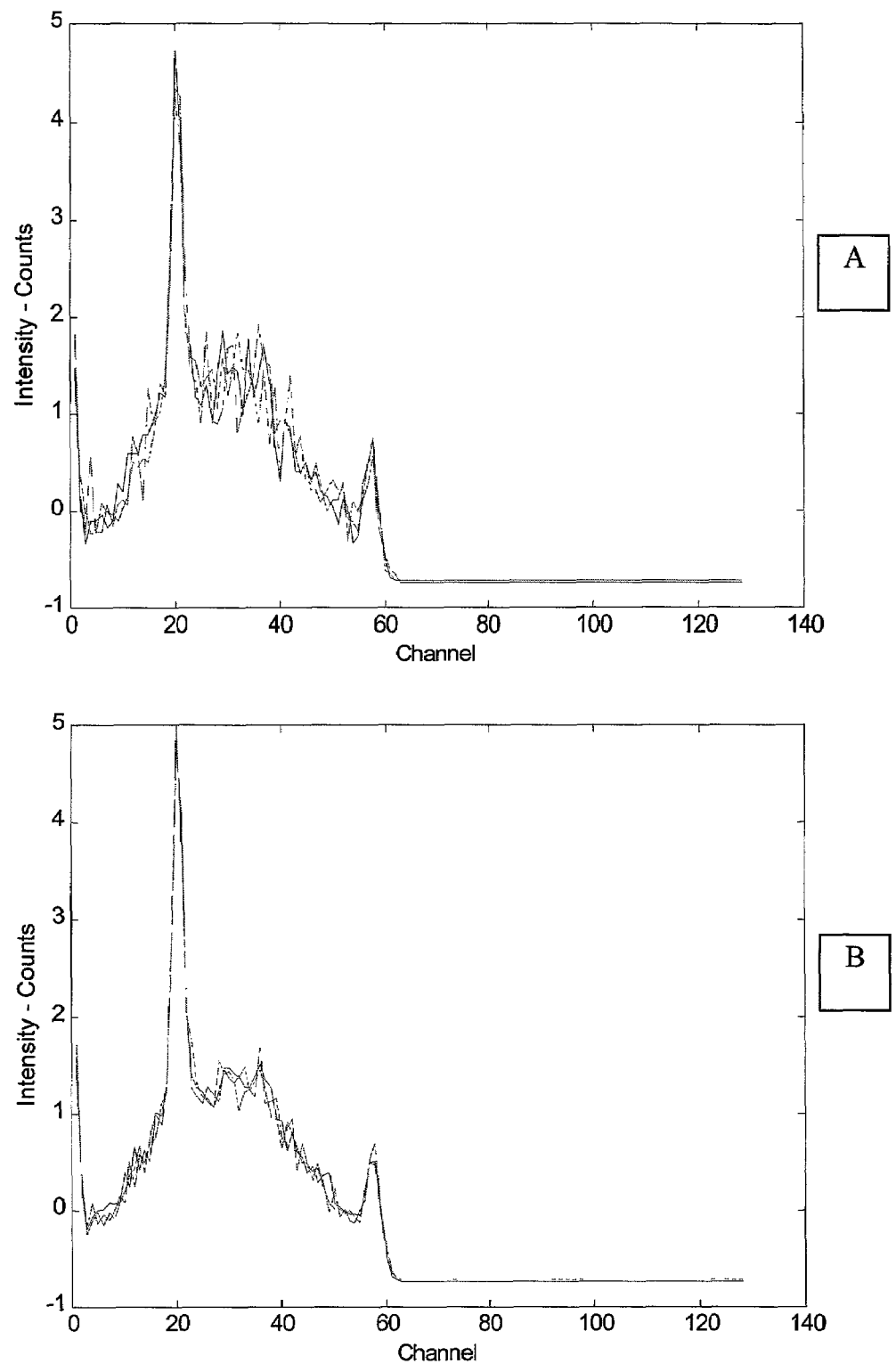
FIG. 14 illustrates normalized spectra with X and 5X counting times.
Figure 15:
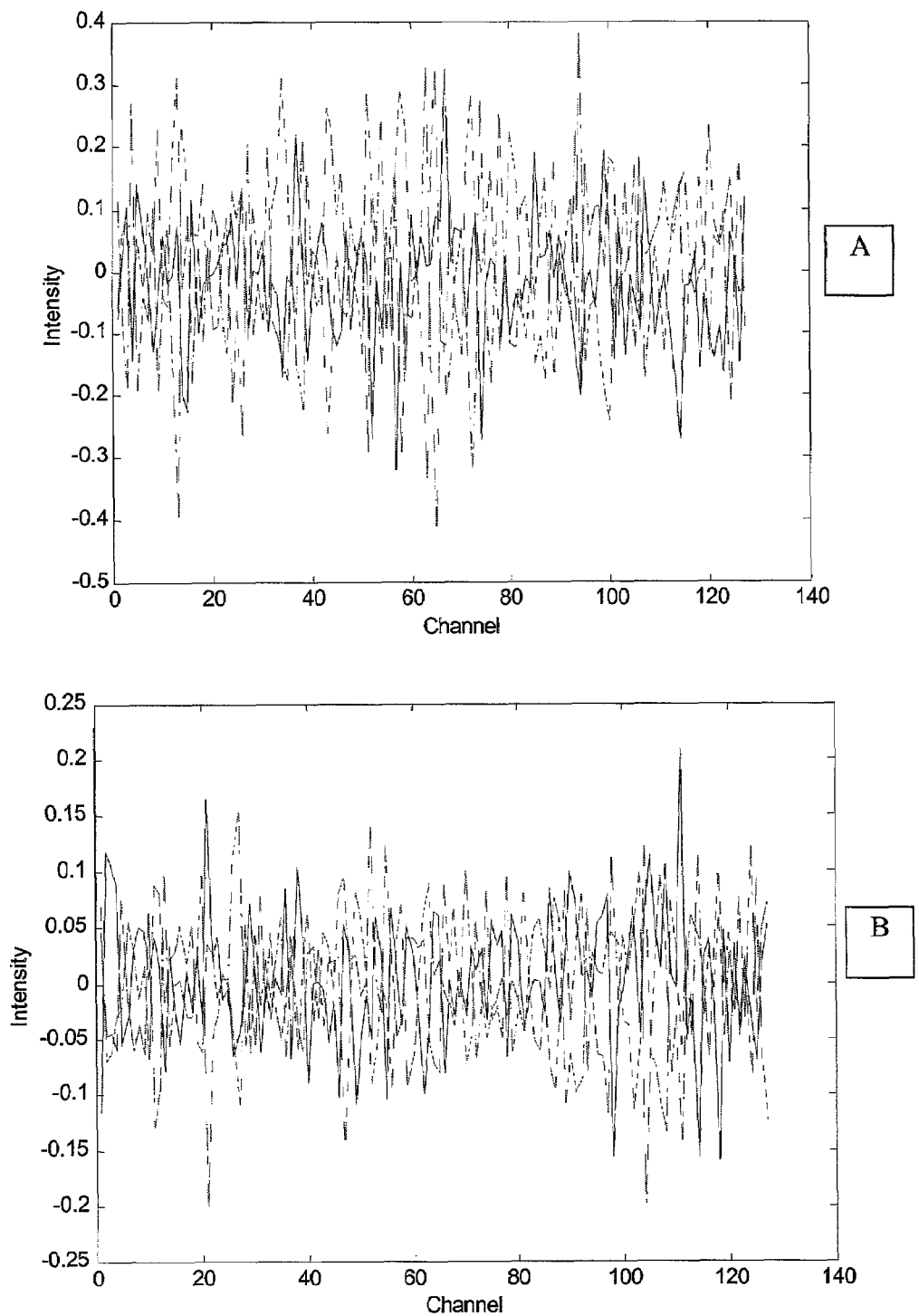
FIG. 15 illustrates $U_{ti}-\overline{U}_{-i}$ with X and 5X counting times.

In the case of the example involving gamma spectra, a relatively large value for $\hat{\sigma}_\delta^2$ might suggest that the underlying gamma spectrum (prior to scaling) has relatively poor signal-to-noise quality. For example, consider the six simulated gamma spectra shown in FIG. 13. These spectra represent repeated measurements of the same material. Three of the spectra are associated with a simulated counting time of X, while the other three are associated with a counting time of 5X and thus have better signal-to-noise quality. These spectra (not square-root transformed) are centered and scaled prior to applying the PTP. (Also see FIG. 14; the spectra associated with a counting time of X are noiser.) Following the PTP operation, one observes $U_{ti} - \overline{U}_{\cdot i}$ (for each set of three spectra). FIG. 15 displays $U_{ti} - \overline{U}_{\cdot i}$ associated with each counting time case. In the case of relatively poor signal to noise (counting time is X), $\hat{\sigma}_\epsilon = 0.1283$, whereas in the case of relatively good signal-to-noise, $\hat{\sigma}_\epsilon = 0.0621$.

Simulated measurements of the same class at different counting times to vary signal-to-noise quality have been used here. From repeated observations of U one can ascertain the relative signal-to-noise of the inputs. In practice, an adversary could analyze the repeated outputs from a fixed class to ascertain the relative signal-to-noise in the inputs. From that, an adversary might be able to deduce something about the magnitude of the underlying class-specific signal y (e.g., $yy^T$) if there is a relationship between $\sigma_\delta^2$ and $yy^T$. However, even if $\epsilon$ was available to the adversary, nothing about the shape of Y (or y) would be revealed, since mapping $\epsilon$ to $\delta$ is as difficult as mapping U to Y.

So far, it has been assumed that $\delta$ is unknown to the adversary. However, if $\delta$ is known or if an adversary had the ability to adjust Y (e.g., by adding a known perturbation) and observe the corresponding change in U, then the adversary could determine $\pi$ and $\sigma$ even without knowledge of Y. Potential adversaries must not have the ability to affect Y.

One way to defend against the adversary would be to vary the signal to noise in the original input spectra (prior to the normalization that results in $YY^T=1$) from measurement to measurement. For example, one could accomplish this by varying the counting time. An assumption here is that the original input noise is only small part of the original total input signal. If that assumption holds, the magnitude of the resulting idealized spectrum is, after normalization, relatively unaffected.

Model 2: $Y=y+\delta$ and $U=u+\epsilon$, the same as Model 1 except that the individual elements in $\delta$ have different variances. This attack assumes that the measurement-error variances of the input channels are unique. The basic strategy of the attack is to do an eigenanalysis of a set of output spectra ($U_1$, $U_2$, ..., $U_N$) from a single class. If certain conditions are satisfied, then each sign-transformed eigenvector is equivalent to a row of $\pm 1 \bullet_\pi W_o$. Given that there are n rows, one can guarantee that a row permutation of the matrix$_\pi$ $W_o$ exists within the set of $2^n$ possible candidates (the set of possible candidates is due to the sign ambiguities of the eigenvectors). The search space is thus reduced from more than n! candidates to one with $2^n$ candidates. The search space can be further reduced greatly by utilizing the known form of the Hadamard matrix. Assume that the row permutation of the matrix$_\pi$ $W_o$ (say $V=_{\omega(\pi)} W_o$) can be identified from the possible candidates. Now given a specific output spectrum (U), V can be used in conjunction with U to obtain a permuted version of the associated input spectrum (Y). That is $Y_{\omega(\pi)}=U \cdot V^T$. Thus, this attack can produce a permuted version of the input spectrum.

The rough argument behind this attack is that the uniqueness of the measurement-error variances of the input channels induces a correlation structure in the output channels. To illustrate, represent the $k^{th}$ replicate (within a class) of the $j^{th}$ output channel as $U_{jk}=w_{j1}Y_{1k}+w_{j2}Y_{2k}+ \ldots +w_{jn}Y_{nk}$, where the w. . terms are the values in the Hadamard-constructed $$W\left(\pm \frac{1}{\sqrt{n}}\right),$$

the Y. terms are the values associated with the input channels, and $k=1,2,\ldots, N$. Now, consider a degenerate case where the first input channel ($Y_1$) is the only input channel that exhibits variability over the set of replicates ($k=1,2,\ldots, N$). Thus, observed variation in the output channels $U_{jk}$ is due solely to the variation in ($Y_1$). The result is perfect positive correlation between output channels j and j' if $w_{j1}=w_{j'1}$ (concordant channels) and perfect negative correlation between these output channels if $w_{j1}=-w_{j'1}$ (discordant channels). In the general case, an eigen-analysis of the sample covariance matrix of the output channels (n by n) could be used to extract the rows of W. The sample covariance matrix of the output channels is decomposed into n n-dimensional eigenvectors. In the present example this analysis was accomplished via a singular-value decomposition of the mean-centered output spectra. A sample size (N) that is suitable for the degree of variance similarity across input channels is required (more similarity in variances requires a larger sample size). An element-by-element sign transform of each eigenvector will result in a vector that is equal to a column of W (to within a sign). It does not seem possible to resolve the sign ambiguity.

Note that the difficulty in implementing this attack increases as the channel variances become more homogeneous, the sample size (N) decreases, and the dimension of the spectrum (n) increases.

In order to characterize the efficacy of this attack over a broad range of conditions, the following limited study was conducted. The degree of variance similarity was controlled by the function $V_i=(1+f)^i$, $i=1,2,\ldots,n$, where $V_i$ is the measurement error variance associated with the $i^{th}$ input channel. For this study, the assumed distribution of the measurement errors in Normal. Larger values of f impose greater diversity in variance and hence make the attack easier. When f=0, this attack will not work even for an arbitrarily large replicate sample size. Values of n that were considered are in the set {8, 16, 32, 64, 128}. Replicate sample sizes considered (N) are in the set {10, 100, 1000, 10000}. For each value of f∈{0.025, 0.05, 0.1, 0.2, 0.5, 1} and n we identified (in a rough sense) the minimal sample size that would allow a successful attack (Table 2).

TABLE 2

| | Sample Size Required* for Successful Attack | | | | | |
|---|---|---|---|---|---|---|
| | f = .025 | f = .05 | f = .10 | f = .20 | f = .50 | f = 1.0 |
| n = 8 | 10,000 | 10,000 | 1,000 | 1,000 | 100 | 100 |
| n = 16 | 10,000 | 10,000 | 10,000 | 1,000 | 100 | 100 |
| n = 32 | >10,000 | 10,000 | 10,000 | 1,000 | 100 | 100 |
| n = 64 | >10,000 | 10,000 | 10,000 | 1,000 | 100 | 100 |
| n = 128 | >10,000 | 10,000 | 10,000 | 1,000 | 1000 | 1000 |

*Smallest value of {10, 100, 1000, 10000} that will likely facilitate a successful attack.

This is just a rough order of magnitude estimate. Note that a hard restriction is that the sample size must exceed n.

For any particular situation, the ratio of the largest variance to the smallest is $(1+f)^{n-1}$. For example, for n=128 and f=0.025, this ratio is larger than 23. Thus, even with the amount of variance disparity in this case, more than 10,000 replicate samples would be required to make a successful attack.

Efficacy of the PTP Method for Class Discrimination

Suppose the test statistic is of the form $$D = \sum_{j=1}^{m} (U_j(\text{new}) - U_j(\text{target}))^2,$$

where $U_j$(new) represents the $j^{th}$ element of the PTP-spectrum from the item being evaluated and $U_j$(target) is the $j^{th}$ element of the target PTP-spectrum. One concludes that the item is authentic if $D<D_{crit}$.

Case 1: No dimension reduction (m=n)

Suppose $$E = \sum_{j=1}^{n} (Y_j(\text{new}) - Y_j(\text{target}))^2$$

represents the test statistic that is computed when using the original spectra (Y) modified by Step 0. One concludes that the item is authentic if $E<E_{crit}$. For this case, also assume the following:

Theorem: For any real-valued n-dimensional spectrum (Y) and any permutations ($\pi$ and $\sigma$), E=D is W is symmetric orthonormal with dimensions n×n. Alternatively, one could specify that $W^{-1}=W^T$ (see example below with $$W = \frac{1}{\sqrt{N}} H_N,$$

where $H_N$ is a Hadamard matrix of order N).

Proof: The permutations only hide the data. They have no effect on efficacy. U=Y·W and $U_{new}=Y_{new}$·W. Thus, $$D=(U_{new}-U)\cdot(U_{new}-U)^T=(Y_{new}-Y)\cdot W\cdot W^T\cdot(Y_{new}-Y)^T=(Y_{new}-Y)(Y_{new}-Y)^T=E.$$

Note: $W^T\cdot W=W\cdot W^T=I$ if W is symmetric orthonormal.

Consequences of Theorem: If E=D (and $E_{crit}=D_{crit}$), then the classification of an item (authentic or not authentic) is the same whether we use E or D and hence the original spectrum or PTP spectrum. So if E provides adequate discrimination, then D will provide adequate discrimination.

Example: Suppose W is a normalized Hadamard matrix. This choice for W is especially attractive due to its simple binary nature that makes it a good candidate for hardware implementation.

Case 2: Maximum dimension reduction (m=1).

In this case, W is an n×1 column vector. Therefore, U=Y·W and $U_{new}=Y_{new}$·W will now be 1×m row vectors. Thus, $$D=(U_{new}-U)\cdot(U_{new}-U)^T=(Y_{new}-Y)\cdot W\cdot W^T\cdot(Y_{new}-Y)^T$$

where $W\cdot W^T$ is an n×n symmetric matrix.

Case 3: General dimension reduction (m<n)

The efficacy of the method depends on the relationship between W and the data. It is possible that D will be better or worse than E with respect to classification/discrimination.

In the case of the gamma spectroscopy example, discrimination across classes is relatively easy given the relatively large inter-class spectral differences and the relatively good repeatability of spectra. By mean-centering (translating) and scaling the spectra, one has lost the ability to discriminate based on the average value and/or standard deviation within a spectrum. One has, however, maintained the ability to discriminate based on the shape of the spectrum. An accepted test statistic based on the original spectrum (after translation/scaling) is $$D = \sum_{j=1}^{m} \frac{(Y_j(\text{new}) - Y_j(\text{target}))^2}{Y_j},$$

where the denominator could be $Y_j$(new) or $Y_j$(target). Note that this test statistic can be rewritten as $$D = \sum_{j=1}^{m} \left[(Y_j(\text{new}) - Y_j(\text{target}))/\sqrt{Y_j}\right]^2.$$

A nearly equivalent test statistic is obtained by using the square root transformed spectra (followed by translation and scaling), $$D^* = \sum_{j=1}^{m} (Y_j^{1/2}(\text{new}) - Y_j^{1/2}(\text{target}))^2.$$

Note that in the case where Poisson counting errors are responsible for the difference between $Y_j$(new) and $Y_j$(target), the square-root transformation is variance normalizing. That is, the variance of $Y_j^{1/2}$(new)−$Y_j^{1/2}$(target) does not depend on j. This is due to the fact that the variance of Y is Y in the case of Poisson counting errors. Note that D is the sum of the normalized squared measurement differences over the m input channels, where the channel specific normalization is the variance associated with the channel. Note that this variance normalizing transformation would significantly reduce vulnerability to attacks that might utilize the differential variances of input channels.

Dimension Inflation

Suppose that the dimension of the signal of interest is small enough such that it is computationally feasible for an adversary to examine the whole sample space of possible permutations. One way to reduce the computational feasibility of a brute-force examination of the sample space would be for the host to add pseudo-dimensions that would be indistinguishable when compared to the true dimensions (e.g., both Gaussian white noise). This can improve security considerably.

Let:
1. $Y_\pi W$ be 1×m,
2. E be a m'-dimensional random variable with independent elements having approximately the same distribution as the elements of $Y_\pi W$ (e.g., normal mean zero and variance 1), and
3. $\epsilon$ be a m'-dimensional random variable with independent elements having mean zero and variance $\sigma_\epsilon^2$ of the order of the reproducibility of measurements within a class.

Characteristics of E and $\epsilon$ are as follows: E is constant within a measurement class and variable across measurement classes. E could be a consequence of the seeds used to generate $\pi$ and $\sigma$ or derived from another seed that is private to the host and specific for a particular class. $\epsilon$ varies within a class from measurement to measurement (perhaps derived from yet another seed).

The net transmitted signal is of the form $Z=[Y_\pi W\ E+\epsilon]_\sigma$. Z has dimension m+m' with approximately identically distributed elements (statistically indistinguishable). Thus, one has intermixed signals that are relevant to the measurements of the class $Y_\pi W$, irrelevant to the measurement but specific to the class (E), and irrelevant to the class ($\epsilon$). Without $\epsilon$ the inspector could compare transmitted signals $(Z=[Y_\pi W\ E])_\sigma$ and determine the positions of the elements of E. Of course, with the addition of $\epsilon$ there is some impact on discrimination performance. Thus, there is an inherent tradeoff between increased security (m+m'>m) and the ability to discriminate between classes (when $\sigma_\epsilon^2>0$). Naturally, the ability to discriminate decreases as $\sigma_\epsilon^2$ increases.

Summary

Authentication is difficult because there is no inherent trust embodied in any created thing. In addition, approximate authentication is difficult because a consistent representation of the authenticated item is not available. The need to conceal details of the original signal such that an adversary cannot learn useful information about the original signal adds complexity to the underlying authentication objective. The PTP method and system of the invention offers an information hiding technique usable in high security applications. By design, the present invention is such that the value of a simple Eucidean-distance authentication metric based on the PTP output will provide results that exactly match the value of the metric that is obtained by using the original input. Hence, authentication of a sensitive input signal can be achieved indirectly by authenticating the "non-sensitive" output signal. The invention has been demonstrated analytically and empirically to provide a high level of assurance that details of the original signal remain unknown and authentication is effective.

INDUSTRIAL APPLICABILITY

The invention is further illustrated by the following non-limiting examples.

EXAMPLE 1

In a weapons monitoring application, the host country is responsible for the inspected item and plays the role of the inspecting agent. The other parties to a particular treaty act as inspectors. The goal of weapons monitoring is to distinguish between different classes of weapons so that certain treaty-limited items can be tightly controlled. Therefore, there is no need to distinguish between individual weapons.

The monitoring system is initialized once for each class of weapon. During this step, a single weapon representing the entire weapons class is inspected using out-of-band means to acquire trust in the monitoring system from this time forward. If the initialization weapon is not a trustworthy representative of the weapon class, then subsequent inspections cannot be trusted either. During initialization, a class-specific passcode is entered to form the secret permutations within the monitoring equipment. The same passcode must be entered at all subsequent inspections of the same weapon class and the passcode must be kept secret. After initialization, the monitoring equipment can erase the passcode, the permutations, and the classified data from the weapon measurement so that it no longer holds any secrets. The output of the initialization process is an unclassified reference signal that the inspector can use for subsequent inspections of the weapon class.

During a routine inspection, the monitoring equipment acquires a measurement of the weapon, accepts a passcode from the host country, and outputs an unclassified inspection signal. The inspector can make a statistical similarity measurement between the inspection signal and the reference signal to arrive at an authentication result.

Figure 4:
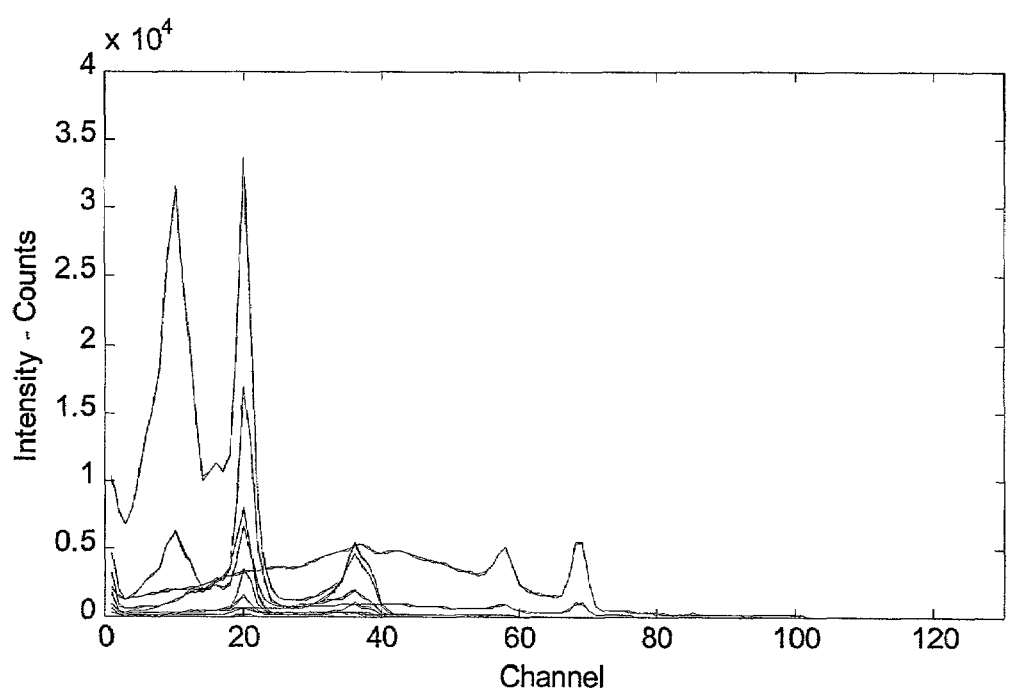
FIG. 4 illustrates a gamma spectra for Example 1.

In the nuclear weapons verification area, gamma-ray spectroscopy can be used to uniquely identify weapon classes. The basis for this is the unique radio-isotopic/structural configuration of each weapon class. This gives rise to a characteristic gamma spectrum for each class. Spectra vary within a class due to manufacturing variation across units, the random nature of radioactive decay and measurement error. To illustrate the PTP method of the invention, thirty artificial gamma spectra were created. The spectra simulate the measurement (including Poisson counting errors) of five different gamma-emitting materials. Each material consists of a mixture of several radionuclides. Two counting times are assumed for each material. For each combination of material/counting time, there are three replicate spectra. The spectra, which have dimension n=128, are displayed in FIG. 4.

The complete data-hiding mechanism in this example is as follows. First, a spectrum is square-root transformed on a pixel-by-pixel basis. (Here, the square-root transformation is variance-normalizing.) Next, the square-root transformed spectrum is centered (translated) and normalized such that its average value is 0 and standard deviation is 1. The resulting spectrum is then permuted (via a random permutation, $\pi$) and transformed via a normalized Hadamard matrix $$\left(W = \frac{1}{\sqrt{n}} H_n\right).$$

Figure 5:
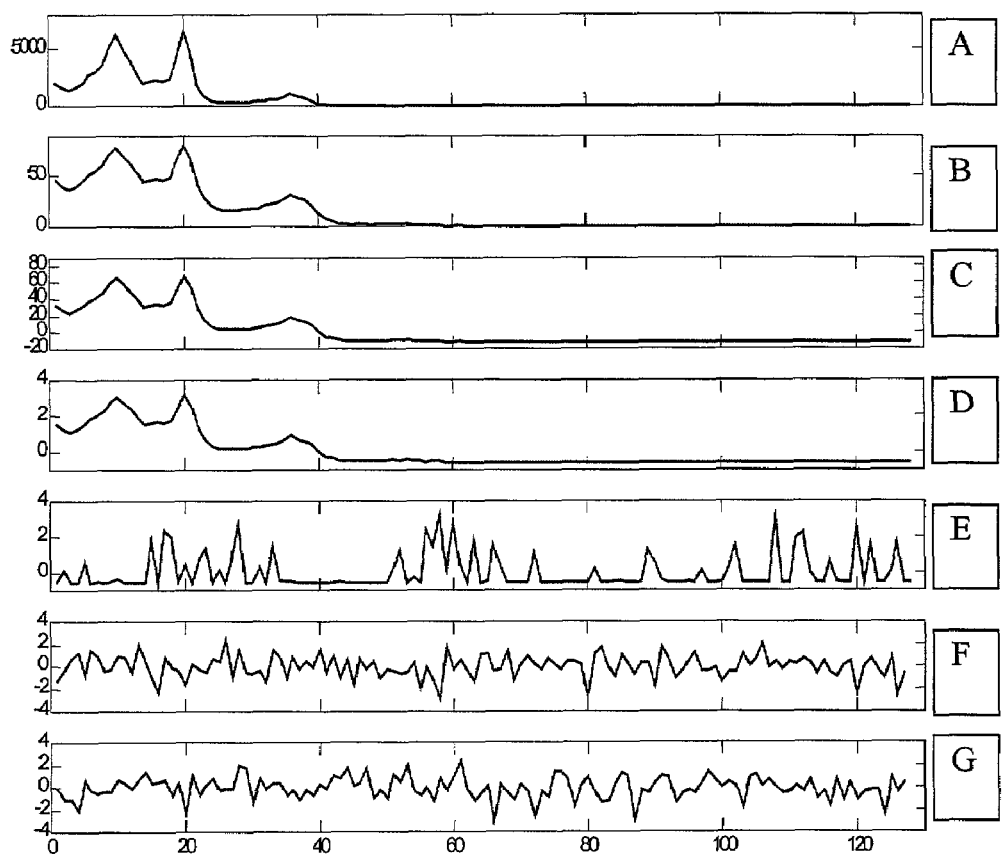
FIG. 5 illustrates a step-by-step metamorphosis of an individual spectrum from its original state to its final state according to the invention.

The first latent variable is identically zero by construction, because the first column of W is a constant and the average spectrum is zero. Since there is no information in the first latent variable it is deleted. The remaining latent variables (m=127) are permuted via a random permutation, $\sigma$. FIG. 5 illustrates the step-by-step metamorphosis of an individual spectrum from its original state (Y) to its final PTP-state (U). Notice that, as expected from theory, the public version of the spectrum, labeled G, is effectively indistinguishable from Gaussian white noise.

Figure 6:
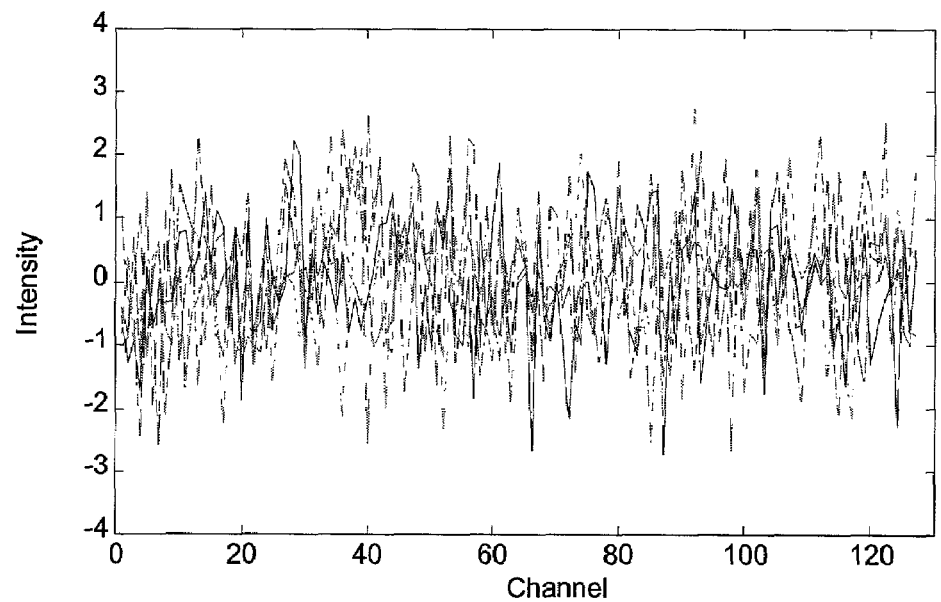
FIG. 6 illustrates multiple output spectra from a single input spectrum.

FIG. 6 displays five output spectra that are the result of varying the permutation set $\{\pi,\sigma\}$ when constructing the output spectrum. These radically different output spectra were constructed by applying different random permutation sets (and W) to the spectrum in FIG. 5 (label D).

Figure 7:
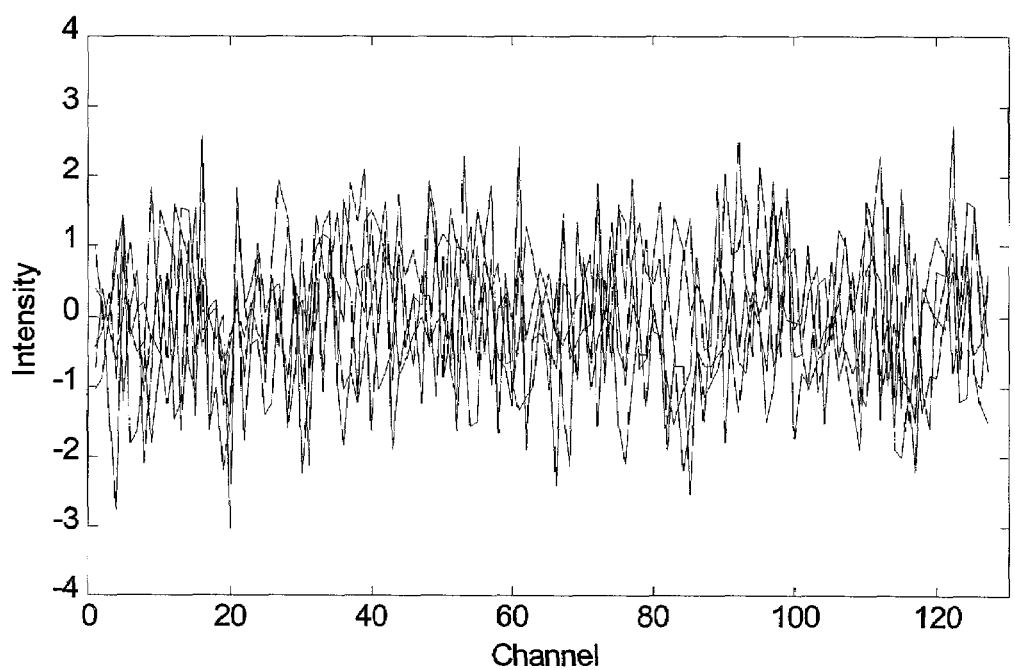
FIG. 7 illustrates output spectra from different input classes.

FIG. 7 illustrates the effect of applying different random permutations (in conjunction with the fixed W) to input spectra from different classes. A comparison of FIGS. 6 and 7 shows that there is as much diversity within a class (using different permutation sets) as there is across classes. The spectra in both figures are essentially indistinguishable from independent Gaussian white noise processes.

Figure 8:
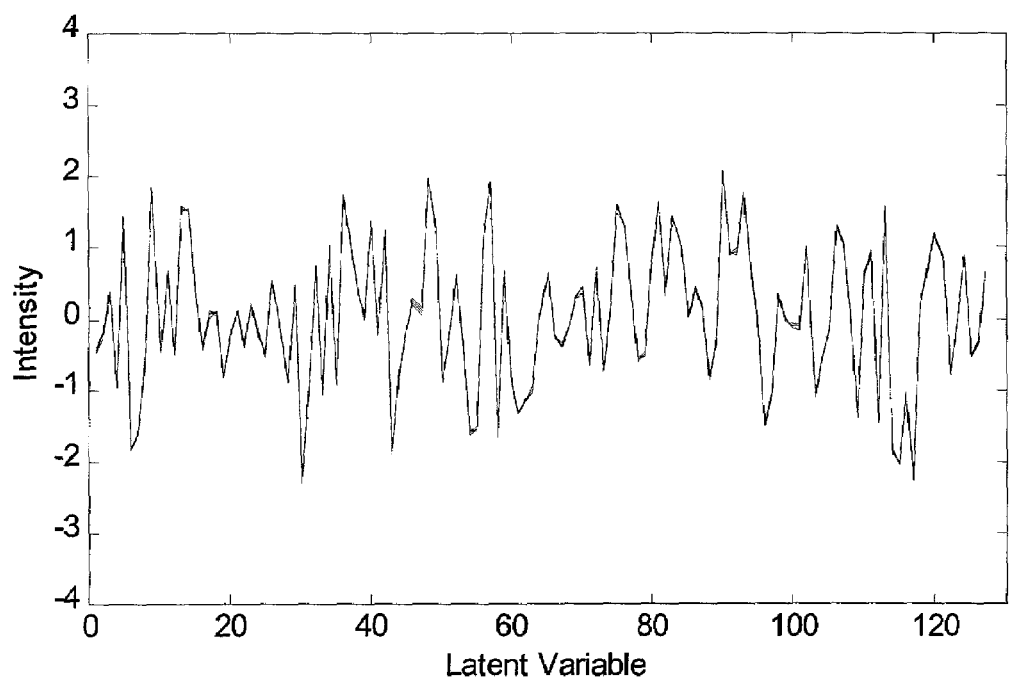
FIG. 8 illustrates output spectra from different input spectra of the same class.

FIG. 8 illustrates the effect of applying the same transformation (W and $\{\pi,\sigma\}$) to the two sets of replicates of a single class. As is evident, there are only very minor differences across the spectra.

EXAMPLE 2

In a biometric application of the present invention, individual people represent the inspected agent and the inspected item is some biometric (e.g., fingerprint, retinal scan, hand geometry, etc.) of the inspected agent. The passcode is analogous to a personal identification number (PIN) that is entered by the individual or is read from a badge held by the individual. The inspector in this application is in control of both the monitoring equipment and the reference templates.

Initialization of the biometric monitoring system occurs once for each individual person. During this step, trust in the individual is acquired using out-of-band means. Once trust is established, the individual's biometric is measured, the PIN is acquired and a reference signal is computed for use during subsequent authentication of the individual.

When a PIN is entered by an individual or via a badge, the monitoring equipment retrieves the appropriate reference signal, measures the biometric and tests the "hidden" biometric with the reference signal as a test of authentication. The biometric is hidden so a collection of reference signals can be stored on a server while maintaining privacy of the associated biometrics.

The preceding examples can be repeated with similar success by substituting the generically or specifically described operating conditions of this invention for those used in the preceding examples.

Although the invention has been described in detail with particular reference to a number of specific embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

We claim:

1. A method of authenticating an item, the method comprising:
   a) acquiring an unencrypted reference signal, $Y_{ref}$, of an item; where $Y_{ref}$ is an n-dimensional row vector $\{Y_1(\text{ref}), Y_2(\text{ref}), \ldots, Y_n(\text{ref})\}$ of unencrypted reference measurements subject to measurement error;
   b) applying a transformation to the unencrypted reference signal, $Y_{ref}$, to generate an encrypted reference signal, $U_{ref}$, of the item; where $U_{ref}$ is an n-dimensional row vector $\{U_1(\text{ref}), U_2(\text{ref}), \ldots, U_n(\text{ref})\}$ of encrypted reference measurements;
   c) acquiring an unencrypted new signal, $Y_{new}$, of the item, where $Y_{new}$ is an n-dimensional row vector $\{Y_1(\text{new}), Y_2(\text{new}), \ldots, Y_n(\text{new})\}$ of unencrypted new measurements subject to measurement error;
   d) applying the transformation to the unencrypted new signal, $Y_{new}$, to generate an encrypted new signal, $U_{new}$, of the item; where $U_{new}$ is an n-dimensional row vector $\{U_1(\text{new}), U_2(\text{new}), \ldots, U_n(\text{new})\}$ of encrypted new measurements;
   e) calculating an unencrypted Euclidean distance metric, E, between the unencrypted new and reference signals, $Y_{new}$ and $Y_{ref}$;
   f) calculating an encrypted Euclidean distance metric, D, between the encrypted new and reference measurements, $U_{new}$ and $U_{ref}$;
   g) comparing the encrypted Euclidean distance metric, D, to a critical value, $D_{crit}$;
   h) if $D<D_{crit}$, then deciding that the item is authentic; and
   i) providing the result of the decision made in step h) to an authenticator or inspector, thereby allowing the authenticator or inspector to decide if the item is authentic;
   wherein the transformation has the property that the unencrypted Euclidean distance metric, E, is equal to the encrypted Euclidean distance metric, D.

2. The method of claim 1, wherein applying the transformation generates encrypted data that is indistinguishable from Gaussian white noise.

3. The method of claim 1, wherein applying the transformation comprises normalizing the measurements.

4. The method of claim 3 wherein the normalizing step comprises centering and scale-transforming the measurements so that the mean is zero and the standard deviation is 1.

5. The method of claim 1, wherein applying the transformation comprises permuting the measurements.

6. The method of claim 5 wherein permuting comprises employing an item of secret information.

7. The method of claim 6 wherein permuting comprises employing a passcode.

8. The method of claim 7 wherein permuting additionally comprises employing the results of a harsh function of the passcode.

9. The method of claim 1, wherein applying the transformation comprises employing a linear transformation.

10. The method of claim 9 wherein employing a linear transformation comprises employing a n×m linear transformation matrix, W, with orthonormal columns, where $n \leq m$.

11. The method of claim 10 wherein employing a linear transformation comprises employing a normalized Hadamard matrix.

12. The method of claim 10 wherein employing a linear transformation comprises employing a normalized matrix comprising Fourier coefficients with a cosine/sine basis.

13. The method of claim 10, wherein the elements, $w_{ij}$, of the transformation matrix, W, have the following properties:

$$\sum_{i=1}^{n} w_{ij}^2 = 1, \forall_j :$$

$$w_{i1} = \frac{1}{\sqrt{n}}, \forall_i ;$$

and $$\sum_{i=1}^{n} w_{ij} = 0, \forall_{j>1} \text{ with } w_{i1} = \kappa, \forall_i .$$

14. The method of claim 9 wherein employing a linear transformation comprises permuting the linearly transformed data.

15. The method of claim 14 wherein permuting the linearly transformed data comprises employing an item of secret information.

16. The method of claim 15 wherein permuting the linearly transformed data comprises employing a passcode.

17. The method of claim 16 wherein permuting the linearly transformed data additionally comprises employing the results of a hash function of the passcode.

18. The method of claim 1, wherein the measurements comprise biometric data.

19. The method of claim 18 wherein the measurements comprise measurements selected from the group consisting of fingerprints, retinal scans, facial scans, hand geometry, spectral data, and voice data.

20. The method of claim 18, additionally comprising the step of placing reference biometric data on a smart card to be carried by an individual from whom the biometric data was taken.

21. The method of claim 1, wherein the measurements comprise spectral data.

22. The method of claim 21 wherein the measurements comprise weapons spectra.

23. The method of claim 1, additionally comprising the step of adding pseudo-dimensions to the measurements to enhance concealment.

24. The method of claim 1, wherein:

$$E = \sum_{j=1}^{n} (Y_j(\text{new}) - Y_j(\text{ref}))^2$$

and $$D = \sum_{j=1}^{m} (U_j(\text{new}) - U_j(\text{ref}))^2$$

wherein $m \leq n$.

25. The method of claim 1, wherein:

$$E = \sum_{j=1}^{n} \frac{(Y_j(\text{new}) - Y_j(\text{ref}))^2}{Y_j}$$

and $$D = \sum_{j=1}^{m} \frac{(U_j(\text{new}) - U_j(\text{ref}))^2}{Y_j}$$

wherein $m \leq n$; and the denominator can be either $Y_j(\text{new})$ or $Y_j(\text{ref})$.

26. The method of claim 1, wherein:

$$E = \sum_{j=1}^{n} \left(\sqrt{Y_j(\text{new})} - \sqrt{Y_j(\text{ref})}\right)^2$$

and $$D = \sum_{j=1}^{m} \left(\sqrt{U_j(\text{new})} - \sqrt{U_j(\text{ref})}\right)^2$$

wherein $m \leq n$.

27. The method of claim 1, wherein applying the transformation to the unencrypted signal, Y, comprises:

$$Y \rightarrow Y_\pi \rightarrow Y_\pi \cdot W \rightarrow (Y_\pi \cdot W)_\sigma$$

wherein:
  $\pi$ is a permutation of the integers from 1:n that is unique to a particular verification class;
  W is an n×m transformation matrix with orthonormal columns that transforms the vector, Y, of measurements to $m \leq n$ latent variables; and
  $\sigma$ is a permutation of the integers from 1:m that is unique to the particular verification class; and
wherein the verification class comprises one or more physical units, items, or individuals.

* * * * *